(12) United States Patent
Hiroki

(10) Patent No.: US 7,619,700 B2
(45) Date of Patent: Nov. 17, 2009

(54) DEFECTIVE PIXEL COMPENSATION SYSTEM AND DISPLAY DEVICE USING THE SYSTEM

(75) Inventor: Masaaki Hiroki, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 343 days.

(21) Appl. No.: 11/386,619

(22) Filed: Mar. 22, 2006

(65) Prior Publication Data

US 2006/0176935 A1 Aug. 10, 2006

Related U.S. Application Data

(63) Continuation of application No. 10/614,977, filed on Jul. 8, 2003, now Pat. No. 7,053,976, which is a continuation of application No. 09/713,101, filed on Nov. 15, 2000, now Pat. No. 6,618,115.

(30) Foreign Application Priority Data

Nov. 19, 1999 (JP) ................................. 11-330514

(51) Int. Cl.
*G02F 1/1333* (2006.01)
(52) U.S. Cl. ........................................ 349/54; 349/192
(58) Field of Classification Search ........................ None
See application file for complete search history.

(56) References Cited

U.S. PATENT DOCUMENTS

| 5,504,504 A | 4/1996 | Markandey et al. ......... 345/214 |
|---|---|---|
| 5,643,826 A | 7/1997 | Ohtani et al. .................. 437/88 |
| 5,731,613 A * | 3/1998 | Yamazaki et al. ............ 257/350 |
| 5,793,344 A | 8/1998 | Koyama ....................... 345/87 |
| 5,926,246 A | 7/1999 | Tomita et al. ................ 349/192 |
| 6,049,364 A | 4/2000 | Takahara et al. .............. 349/10 |
| 6,081,917 A * | 6/2000 | Yasui et al. .................. 714/746 |
| 6,097,462 A | 8/2000 | Koe ............................ 349/123 |
| 6,154,561 A | 11/2000 | Pratt et al. ................... 382/141 |
| 6,359,662 B1 | 3/2002 | Walker ........................ 348/743 |
| 6,456,339 B1 | 9/2002 | Surati et al. ................. 348/745 |
| 6,456,340 B1 | 9/2002 | Margulis ..................... 348/745 |
| 6,549,183 B1 | 4/2003 | Koyama ....................... 345/92 |
| 6,583,744 B2 | 6/2003 | Bright ......................... 341/145 |
| 6,771,272 B2 | 8/2004 | Deering ....................... 345/581 |
| 6,806,870 B1 | 10/2004 | Takanashi .................... 345/207 |

FOREIGN PATENT DOCUMENTS

JP 07-130652 5/1995

OTHER PUBLICATIONS

"Journal of the Institute of Television Engineers of Japan," vol. 1, No. 31, pp. 29-35 (1977).

* cited by examiner

*Primary Examiner*—David Nelms
*Assistant Examiner*—Lucy P Chien
(74) *Attorney, Agent, or Firm*—Cook Alex Ltd.

(57) ABSTRACT

With respect to a display device having a high-resolution display panel, It makes possible to prevent to deteriorate the display quality by a dot defect. A display panel having a dot defect is identified and coordinates of the defective pixel are determined. The brightnesses of pixels adjacent to the defective pixel and/or the brightnesses of pixels of other display panels having the corresponding coordinates as the dot defect are increased to reduce the apparent perceptibility of the dot defect.

22 Claims, 20 Drawing Sheets

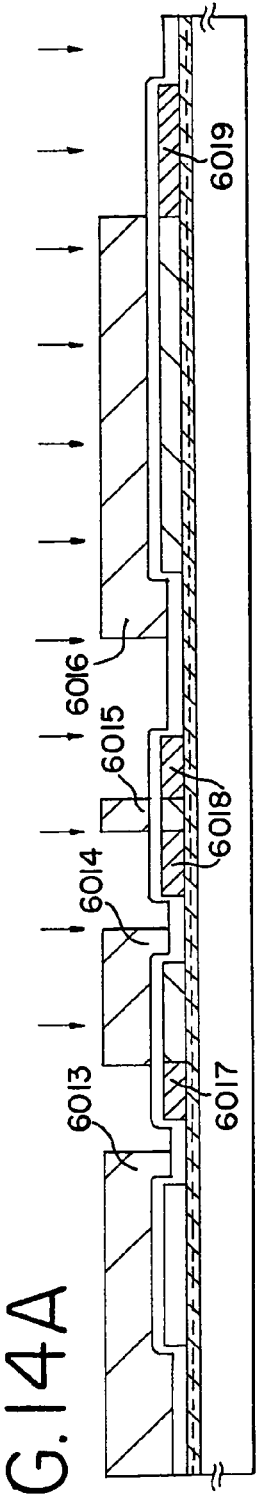
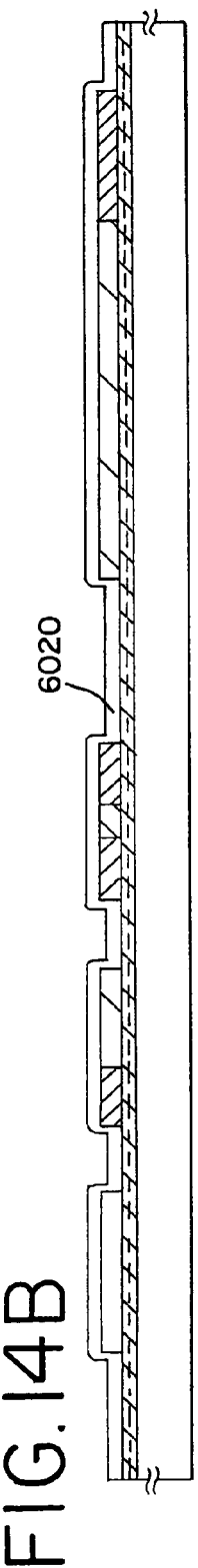
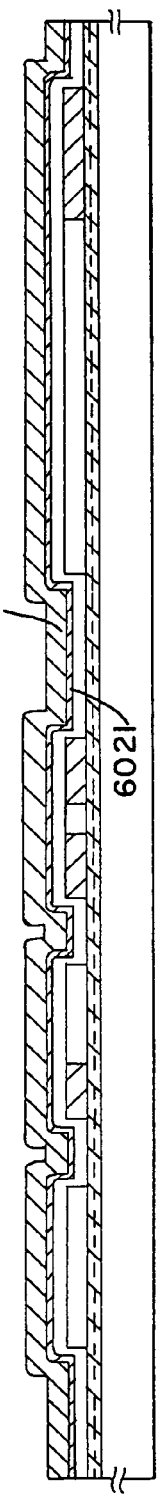
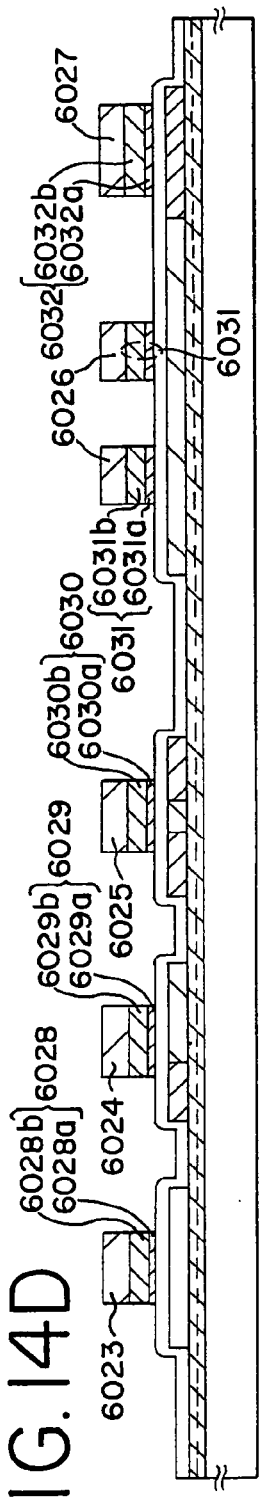
FIG.14A
FIG.14B
FIG.14C
FIG.14D

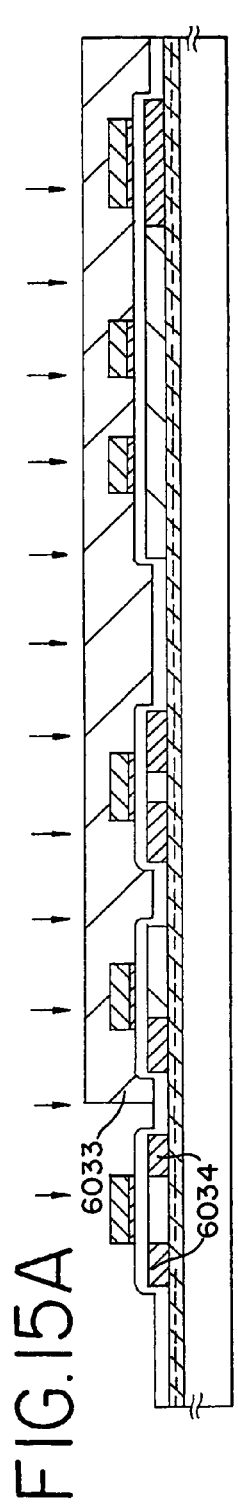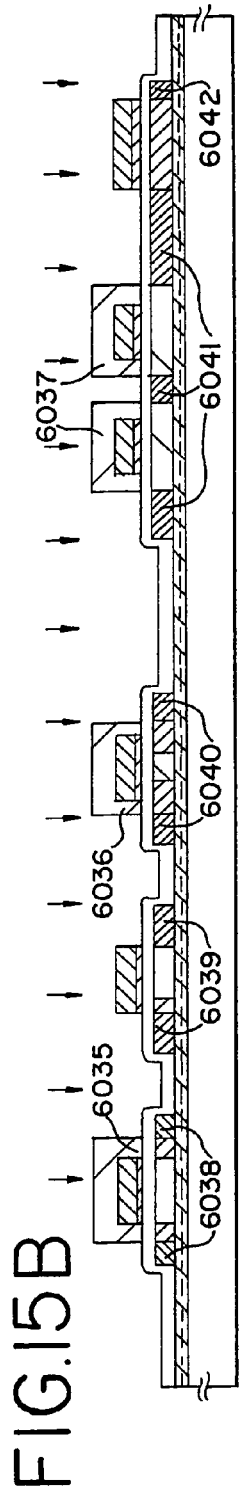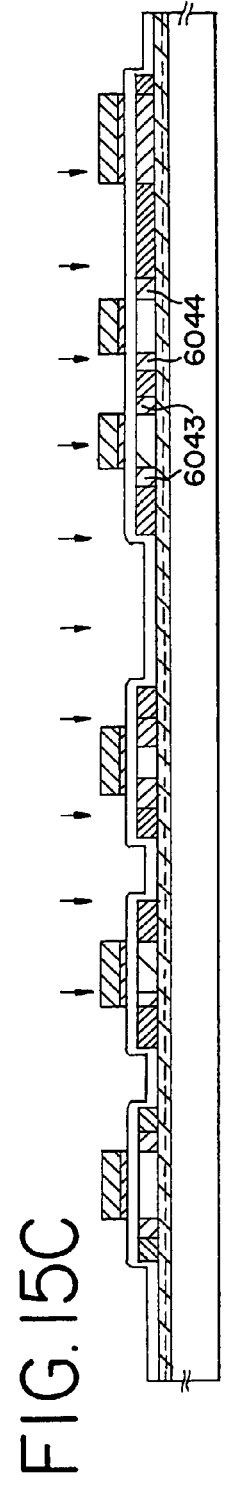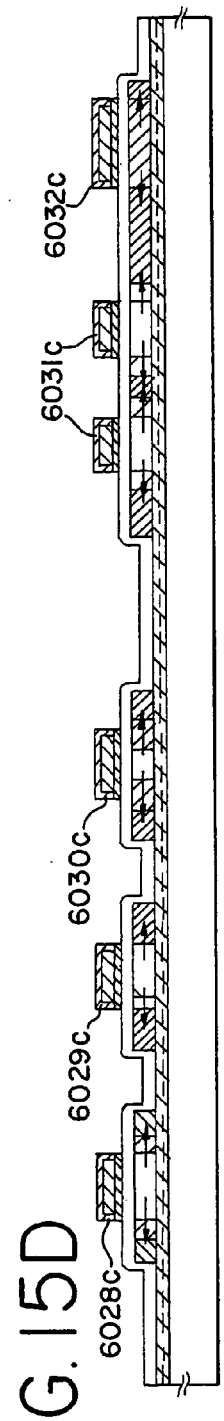

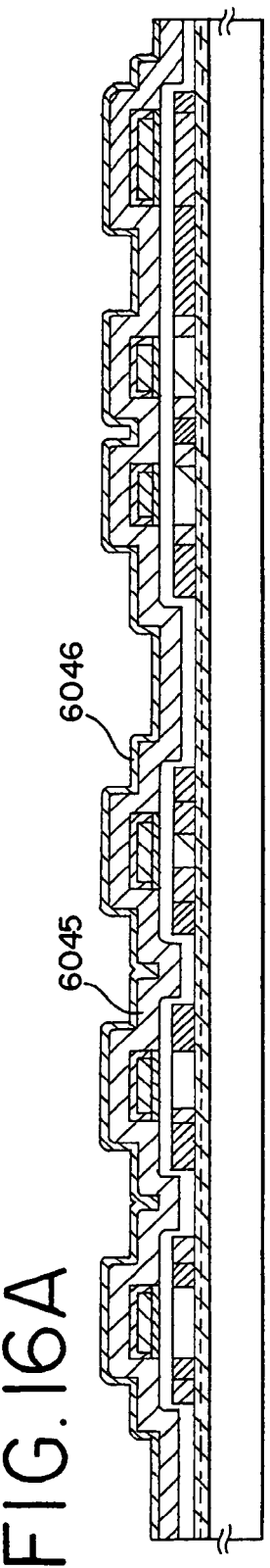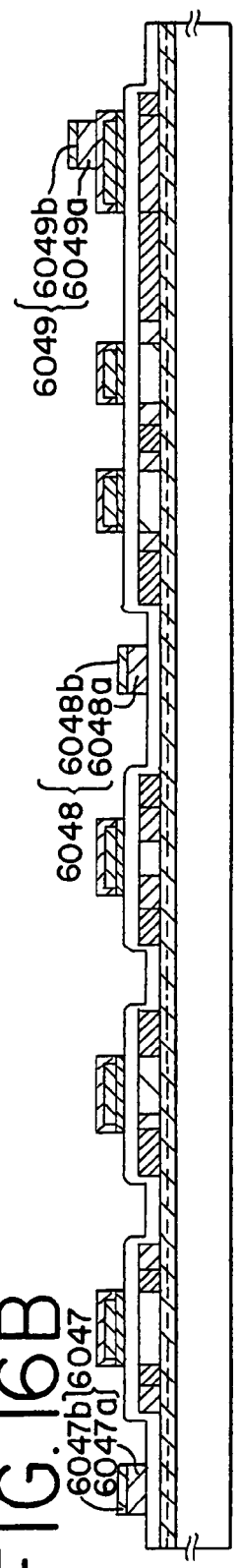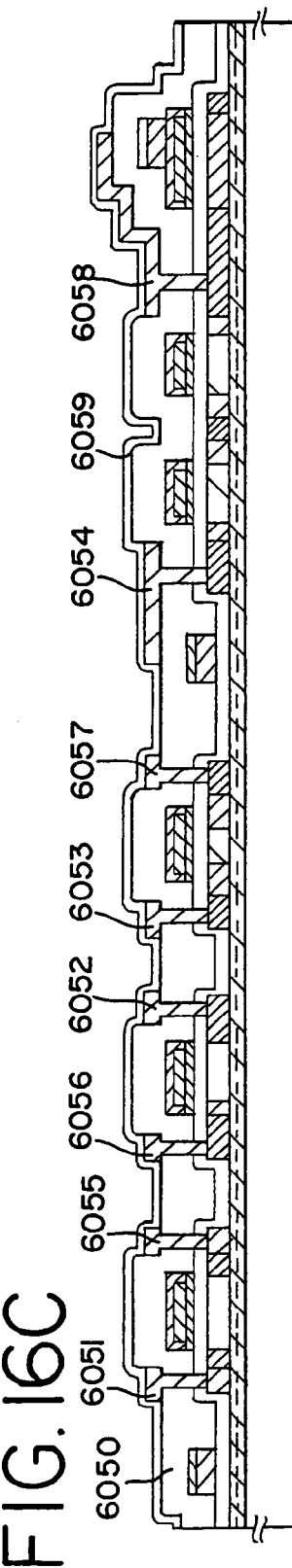

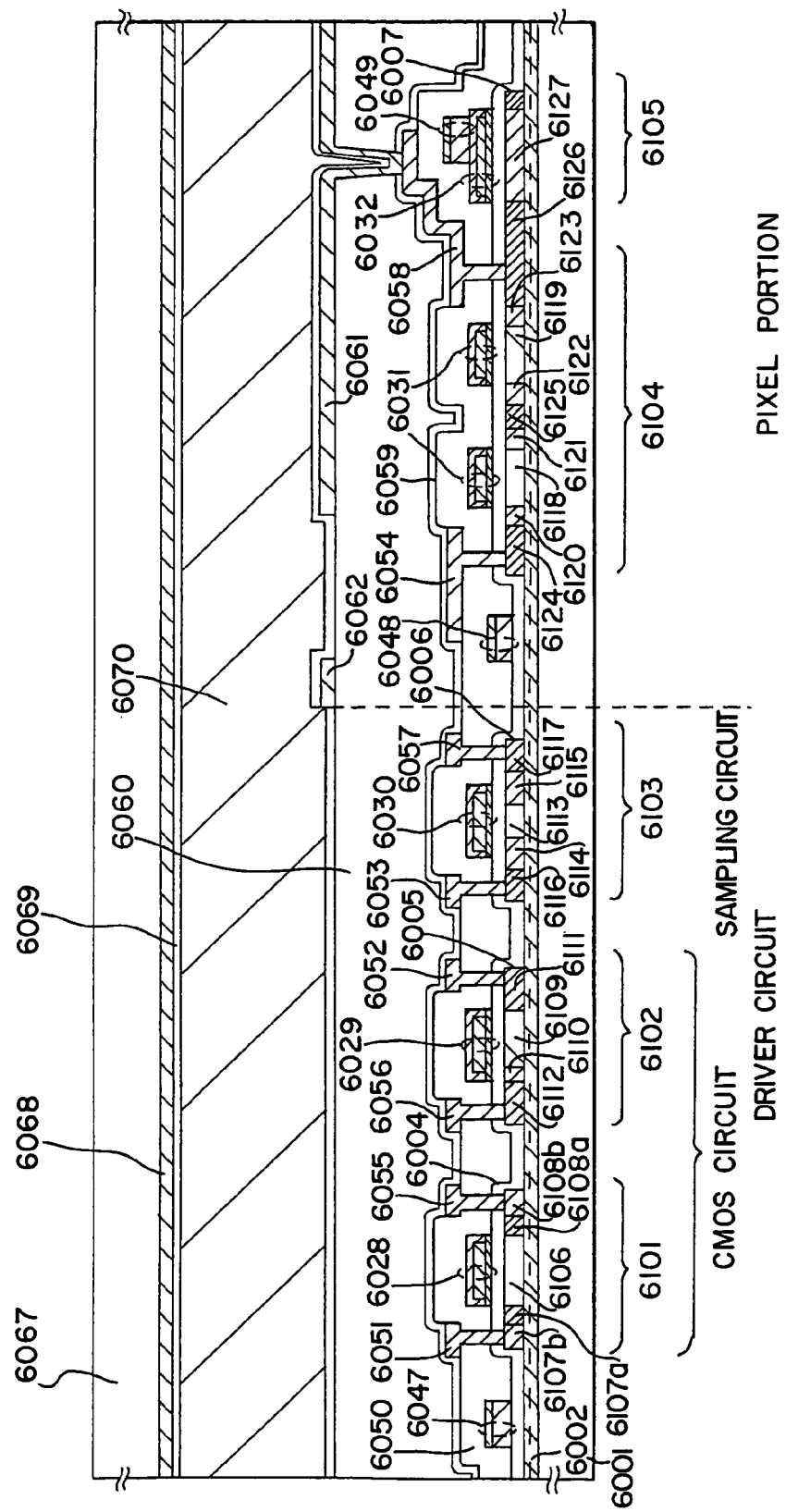

CHARACTERISTICS OF CHROMATICITY AND BRIGHTNESS

DEFECTIVE PIXEL COMPENSATION SYSTEM AND DISPLAY DEVICE USING THE SYSTEM

This application is a continuation of U.S. application Ser. No. 10/614,977, filed on Jul. 8, 2003 now U.S. Pat. No. 7,053,976 which is a continuation of U.S. application Ser. No. 09/713,101 filed on Nov. 15, 2000 (now U.S. Pat. No. 6,618,115 issued Sep. 9, 2003).

BACKGROUND OF THE INVENTION

1. Field of the Invention

The present invention relates generally to projection display devices, and more particularly, to an active matrix type projection display device, typically a rear projection type or a front projection type liquid crystal display device.

2. Description of the Related Art

The development of techniques for manufacturing semiconductor devices, such as a thin-film transistor (TFT), having a semiconductor thin film formed on a low-priced glass substrate, has recently been promoted with the increase in demand for active matrix liquid crystal display devices (liquid crystal panels).

Also, projection type liquid crystal display devices (liquid crystal projectors) have attracted attention, in which pixel portions of liquid crystal panels are irradiated with strong light from a light source, and light passed through the pixel portions is projected to a screen through a lens to form an enlarged image which are enjoyed by a viewer.

FIG. 18 is a diagram schematically showing the construction of a conventional three-panel type liquid crystal projector using three liquid crystal panels. Light source 8001 is a white light source. Each of dichroic mirrors 8002, 8003, 8004, and 8005 reflects only light having wavelengths in a certain wavelength region and allows light having wavelengths in the other regions to pass therethrough. The dichroic mirror 8002 reflects only red light and allows light of the other colors to pass therethrough. The dichroic mirrors 8003 and 8004 reflect only blue light and allow light of the other colors to pass therethrough. Further, the dichroic mirror 8005 reflects only green light and allows light of the other colors to pass therethrough. Mirrors 8006 and 8007 are total reflection mirrors. Liquid crystal panels 8008, 8009, and 8010 are provided to display red, blue and green images, respectively.

FIG. 19 shows the principle of a three-panel type projector. As shown in FIG. 19, a three-panel type projector provides a color image by combining red, green, and blue images.

As shown in FIG. 20, a case where a defective pixel 9001 exists in the liquid crystal panel 8010 (normally white) displaying a green image will be described. If the defective pixel 9001 is a bright dot, it is subjected to processing of irradiation with laser light or the like to be changed into a dark dot.

In the case where a defective pixel 9001 exists in the liquid crystal panel 8010 which displays a green image, a defect due to the dark dot appears in the green image. It is assumed here that each of the liquid crystal panel 8008 displaying the red image and the liquid crystal panel 8009 displaying the blue image has no defective pixel. In the color image formed by combining the three color images, due to the defective pixel in the green image the brightness of the pixel is reduced, and the pixel 9002 with the defect has a purplish color image displayed by combining a red image and a blue image.

Therefore, image in this defective portion is perceptible, thus causes deteriorating the quality of the displayed image.

SUMMARY OF THE INVENTION

In view of the above-described problem, an object of the present invention is to provide a display device capable of limiting deterioration of a displayed image even in a case where a display panel having some defective pixels is used.

The present invention is characterized by performing data correction in image display in such a manner that, if there is a defective pixel in a display panel, based on data on positional coordinates determined as the position of the defective pixel, the brightness of other pixels corresponding to predetermined coordinates is increased and the average value of the brightness (referred to as "average brightness", hereinafter) of the pixels in a predetermined area is uniform.

As a result of this data correction, the perceptibility of the defect in the image displayed by using the display panel having the defective pixel is reduced, thereby minimizing deterioration of the image.

To determine the positional coordinates of a defective pixel, any of well-known techniques may be used, for example, a method of processing image data obtained by a charge-coupled-device (CCD) camera or the like, a method of checking with only TFTs on the substrate by using an optoelectronic device and a CCD camera, and a method of using a pixel reading circuit mixedly formed on the TFT substrate side.

According to the present invention, a correction table for performing brightness correction is prepared in advance and image data is corrected on the basis of the correction table during ordinary use.

If the defective pixel is not a dark dot but a bright dot, the above-described correction is executed after changing it into a dark dot by repair using laser or the like.

FIG. 1 shows a case of combining red, green and blue images into a color image in a three-panel type projection display device.

In the example shown in FIG. 1, a defective pixel 101 exists in a display panel displaying the green image. It is assumed here that the defective pixel 101 is a dark dot. If the defective pixel 101 is a bright dot, it is changed into a dark dot by a process using laser or the like. Consequently, a defect formed by the dark dot appears in the green image. It is also assumed that each of the display panel displaying the red image and the display panel displaying the blue image has no defective pixel and displays a normal image. Conventionally, in the combination of red, green and blue images, the green image in the color image has a zero level of brightness at a certain position represented by coordinates, due to the existence of a pixel defect in the green image, only the red and blue images are combined to display a purplish image on a pixel 104 which has the defect. The pixel 104 is easily perceptible in the resulting image, and cannot obtain good display quality.

According to the present invention, as shown in FIG. 1, brightness correction is performed with respect to the pixels in the display panel displaying the red image and the display panel displaying the blue image which have the same coordinates (m, n) as the defective pixel in the display panel displaying the green image (more specifically, correction of increasing the average brightness of the pixels 102 and 103). The human sense of sight is higher in lightness sensitivity than in chromaticity sensitivity. Therefore, by only increasing the brightness of the pixels having the same coordinates as the defective pixel, the defective pixel in the resulting image obtained by combining the images of the three display panels becomes harder to percept. In this manner, deterioration of the image can be minimized as much as possible.

The concept of the present invention has been described with an example of a case where a defective pixel exists in a green display panel in a projection display device using three display panels. Needless to say, the present invention is also effective in a case where a defective pixel exists in the red or blue display panels.

The configuration of this invention is described below.

The configuration of the invention disclosed in this application is:

a defective pixel compensation system wherein in a projection display device having three display panels, the system comprises:

means for specifying one of the display panels having a defective pixel out of the three display panels;

means for specifying coordinates of the defective pixel; and means for increasing the brightness of pixels having the same coordinates as the coordinates of the defective pixel in the display panels other than the one display panel having the defective pixel out of the three display panels.

Further, as shown in FIG. 3, the other aspect of the present invention disclosed in this application is characterized in that compensation is carried out to increase brightness of pixels adjacent to the defect pixel of the green display panel in addition to the above structure. While increasing the brightness of the pixel having the same coordinates as the defect pixel, compensation is conducted for increasing the brightness of the adjacent pixels. As the result, the defect pixel in the combined image of images of the three display panels are not remarkable and it is possible to prevent as much as possible the deterioration of the image.

Here, an example of a green display panel, in which defect pixels exist, is shown in a projection display device using three display panels, but needless to say, it is not particularly limited to green display panels.

A defective pixel compensation system for use in a projection display device having three display panels, said system comprising:

means for specifying one of the three display panels having a defective pixel;

means for specifying coordinates of the defective pixel;

means for increasing the brightness of at least one of pixels having coordinates adjacent to the coordinates of the defective pixel; and means for increasing the brightness pixels having the same coordinates as the defective pixel in the display panels other than the display panel having the defective pixel out of the three display panels.

A projection display device comprising:

a light source;

an optical system for separating light emitted from said light source into three fluxes of light;

a group of three display panels including one display panel having at least one defective pixel;

an optical system for combining images formed by said three display panels while projecting the images onto a screen; and a defective pixel compensation system for increasing the brightness of pixels having the same coordinates as the defective pixel in the display panels other than the display panel in which the defective pixel exists.

A defective pixel compensation system for use in a display device having one display panel with a defective pixel, the system comprising:

means for determining positional coordinates of the defective pixel; and means for increasing the brightness of pixels having coordinates adjacent to the coordinates of the defective pixel.

That is, in a direct-view type display device using one display panel, data correction is performed by increasing the brightness of pixels adjacent to the defective pixel in the display panel. This correction, based on increasing the brightness of the adjacent pixels, reduces the perceptibility of the defective pixel in the image of the display panel, thereby minimizing deterioration of the image. This correction is particularly effective in a case where the pixel size is extremely small.

BRIEF DESCRIPTION OF THE DRAWINGS

FIG. 14 is a diagram showing the process of manufacturing the AM-LCD;

FIG. 15 is a diagram showing the process of manufacturing the AM-LCD;

FIG. 16 is a diagram showing the process of manufacturing the AM-LCD;

FIG. 17 is a cross-sectional view of the structure of an active matrix type liquid crystal display device;

EMBODIMENT MODE OF THE INVENTION

Embodiment Mode of the present invention will be described below.

Figure 20:
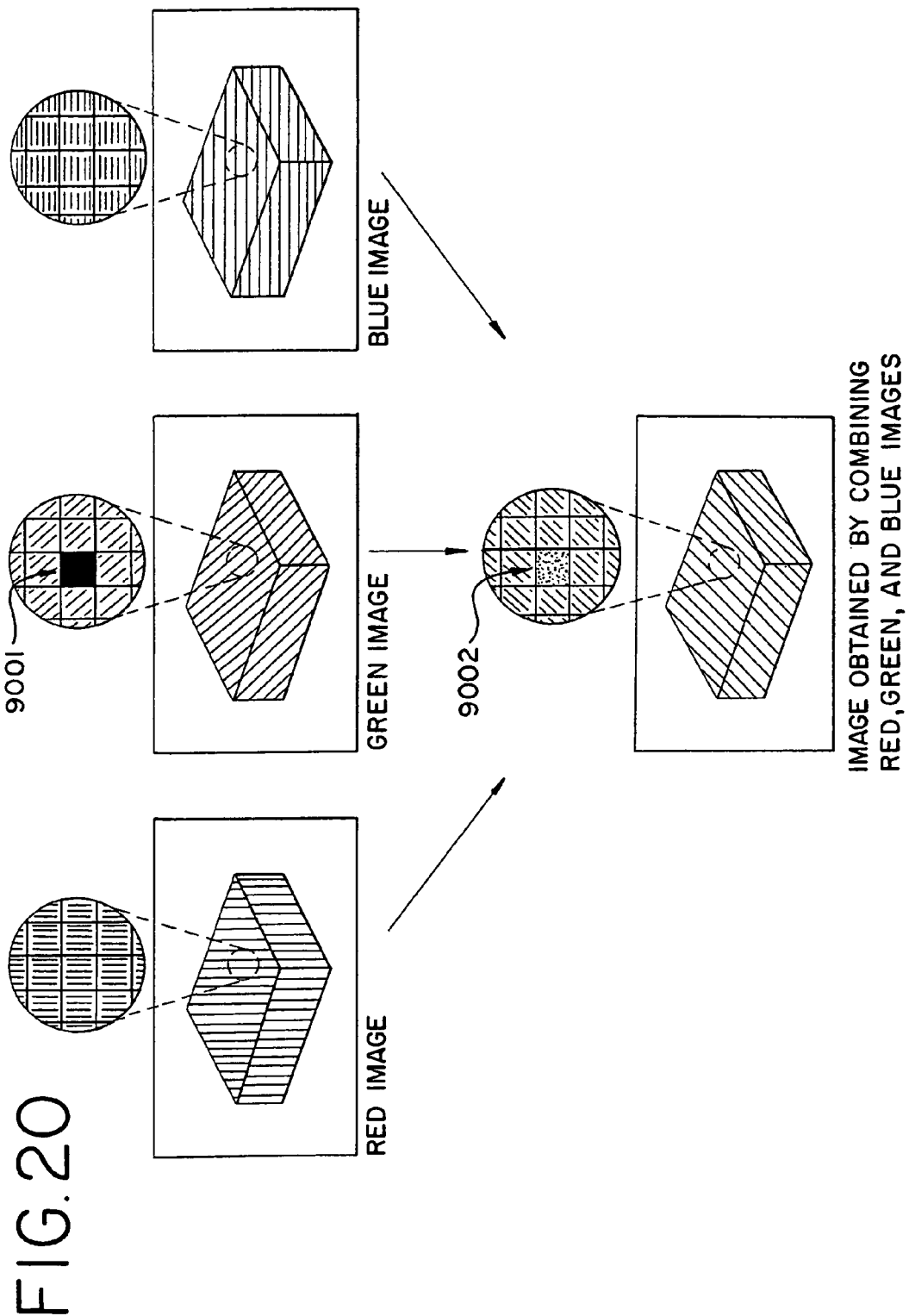
FIG. 20 is a diagram showing a state where a color image is formed in a case where one display panel has one pixel defect (prior art)
Figure 21:
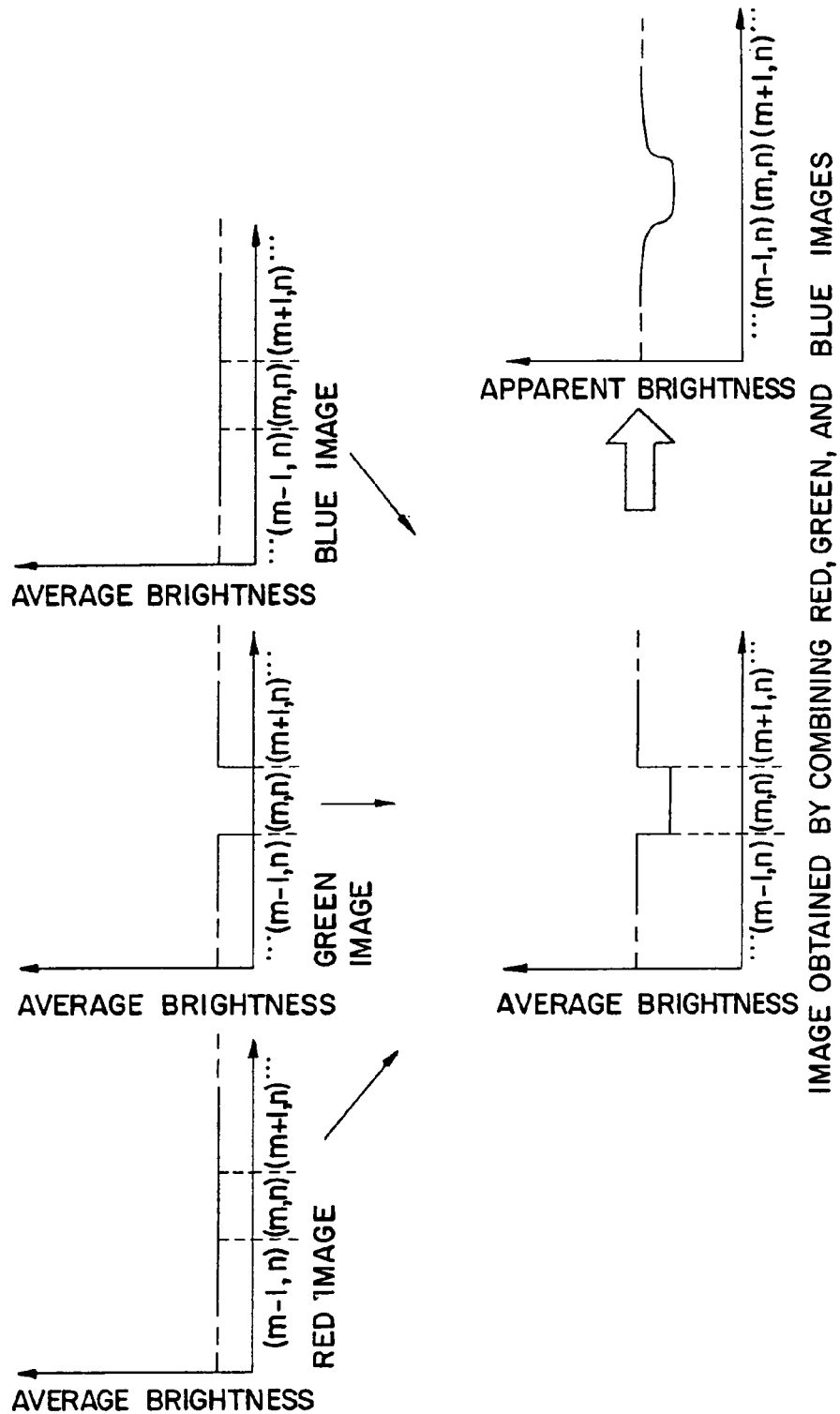
FIG. 21 is a schematic diagram showing a state where a color image is formed in a case where one display panel has one pixel defect (prior art)

In a case where a dark dot designated by coordinates (m, n) exists as a pixel defect in a green display panel as shown in FIG. 20, the average brightness of each of the pixels designated by coordinates (m, n), (m−1, n), and (m+1, n) is as shown in FIG. 21. In this case, in the color image formed by combining red, green and blue images, only the average brightness of red and the average brightness of blue are combined at the position designated by the coordinates (m, n) since the average brightness of green at the position is zero, as shown in FIG. 21. The resulting color is purplish and further the total average brightness is reduced.

Figure 22:
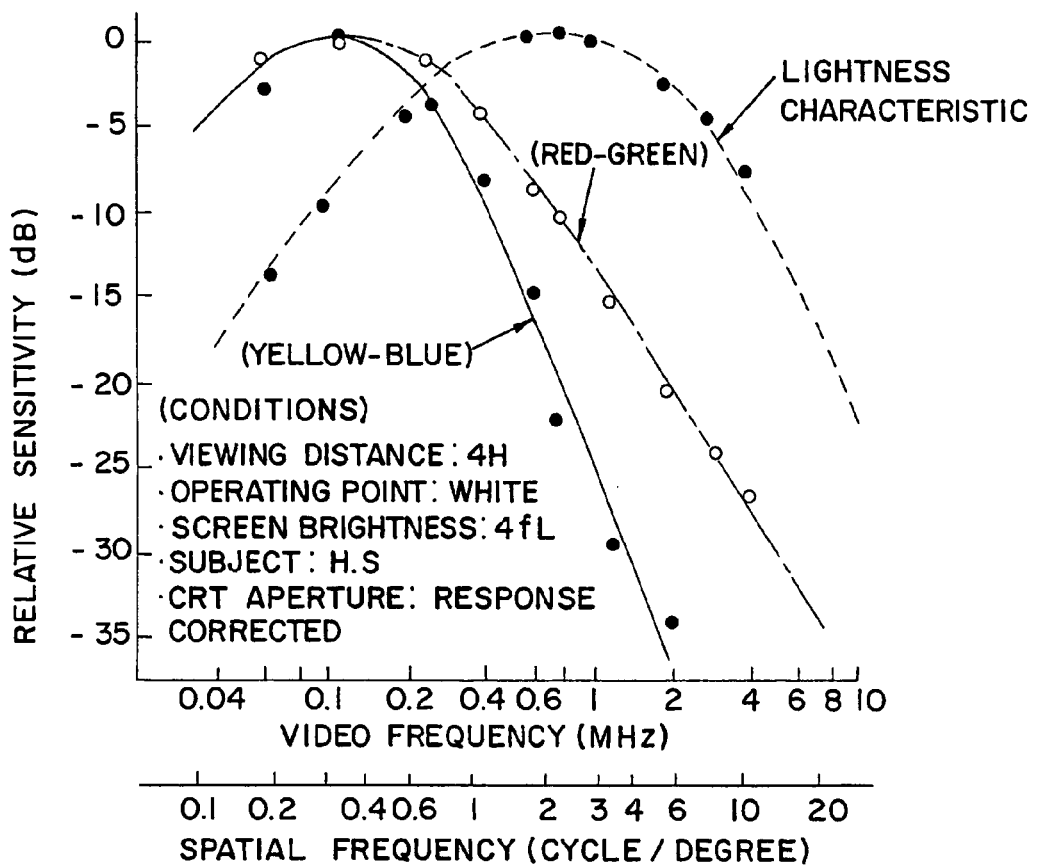
FIG. 22 is a graph showing an example of spatial frequency characteristics of chromaticity and brightness.

As shown in FIG. 22 (as described in the journal of the Institute of the Television Engineers of Japan: No. 3, pp. 29-35, 1977), the lightness sensitivity characteristic and the chromaticity sensitivity characteristics of the human sense of sight differ from each other with respect to spatial frequencies. The chromaticity sensitivity is, at the minimum, ⅛ of the lightness sensitivity, and on the frequency range, the chromaticity sensitivity characteristics is ⅓ to ¼ of the spacial frequency of the lightness sensitivity characteristic.

Under the above-described conditions, the defective pixel is easily perceptible and satisfactory display quality cannot be obtained.

To solve this problem, according to the present invention, the average brightness of the pixel at the position designated by the coordinates (m, n) in the display panel (red or blue) other than the green display panel is increased so that the resulting apparent brightness has a uniform value, thus performing brightness correction.

Figure 1:
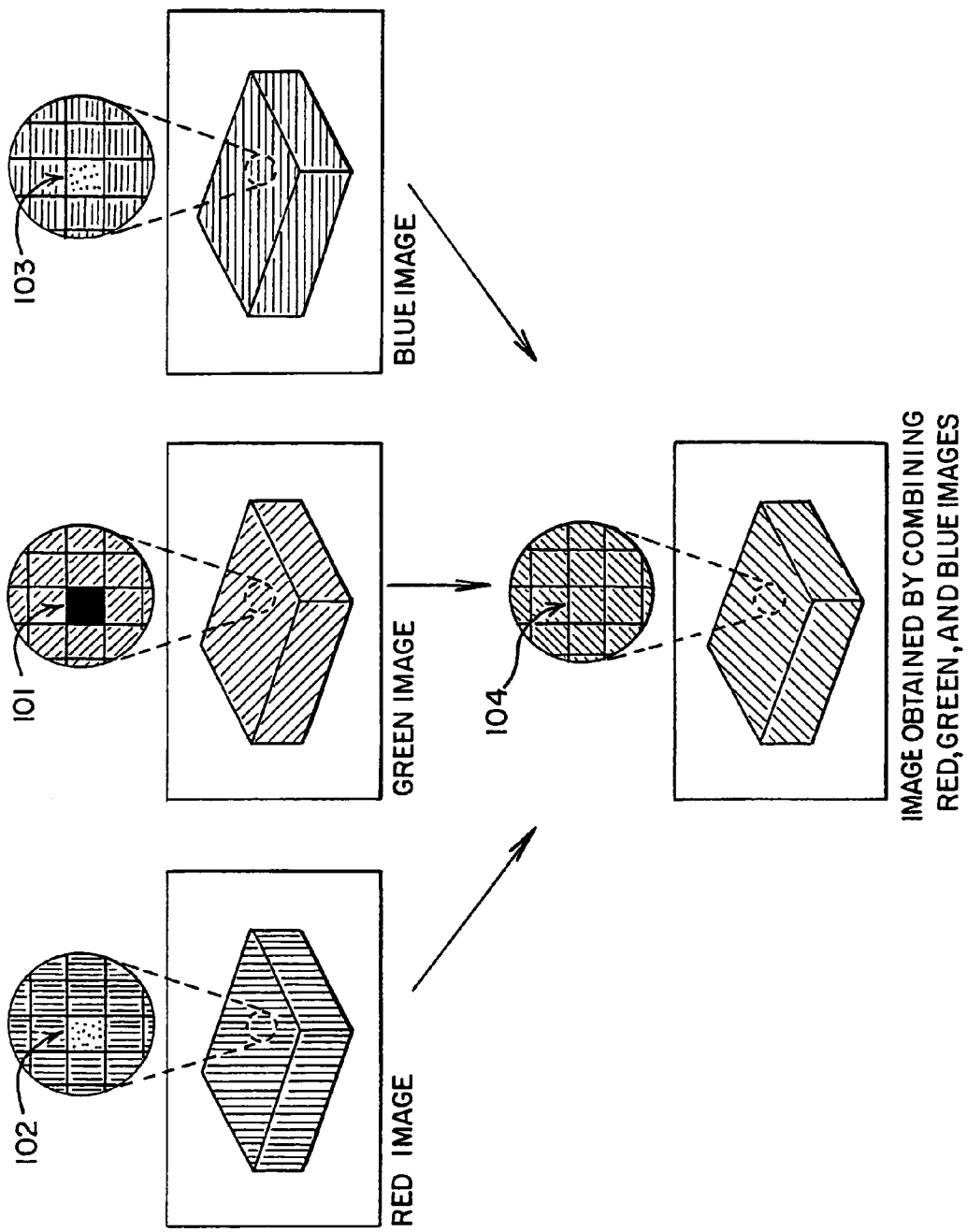
FIG. 1 is a diagram for explaining the concept of the present invention.
Figure 2:
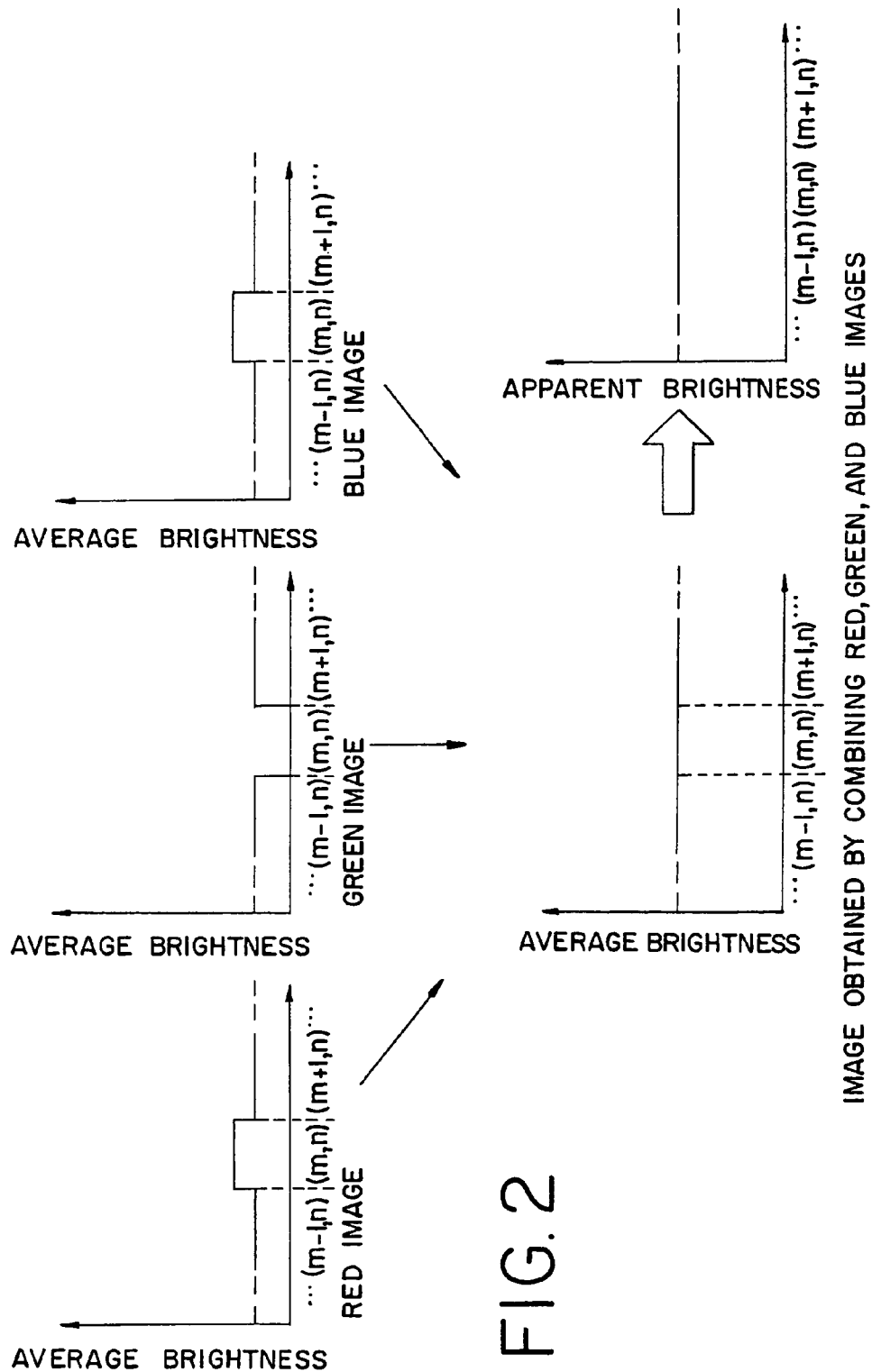
FIG. 2 is a schematic diagram for explaining the concept of the present invention.

In the example of correction shown in FIG. 2, the brightness of each of the pixels at the position designated by the coordinates (m, n) in the red and blue display panels is increased so that the apparent brightness is uniform. This method, however, is not exclusively used. For example, only the average brightness in the red display panel may be increased to compensate for the defect, or only the average brightness in the blue display panel may be increased to compensate for the defect. It is preferred that the apparent brightness should be substantially uniform. However, a comparatively small degree of correction may suffice as long as the difference in brightness is reduced in comparison with that in the conventional display (FIG. 21).

Thus, even if a dark dot exists in display panels, the pixel defect can be corrected so that its position cannot be located by the human eye.

Figure 3:
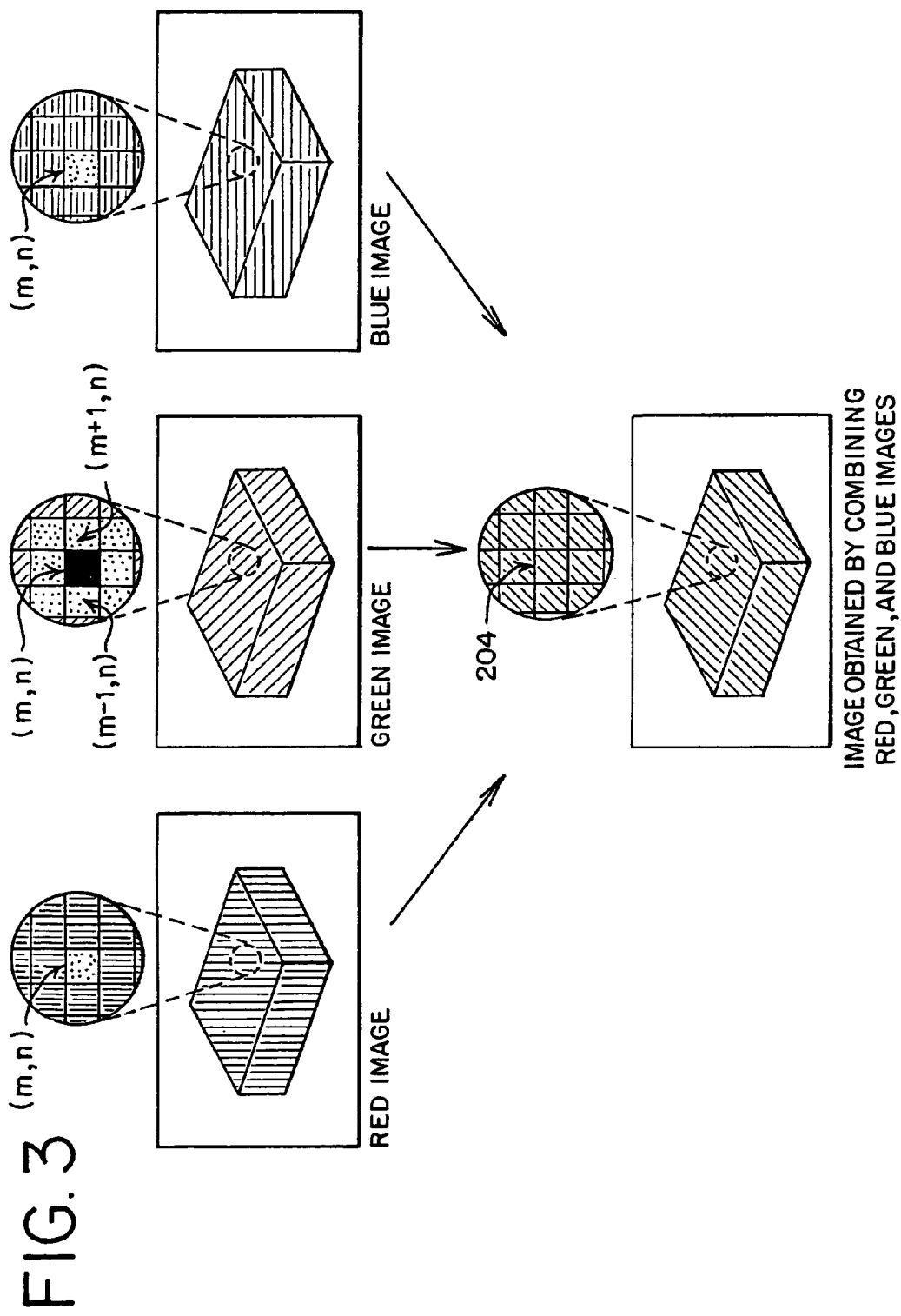
FIG. 3 is a diagram for explaining the concept of the present invention.
Figure 4:
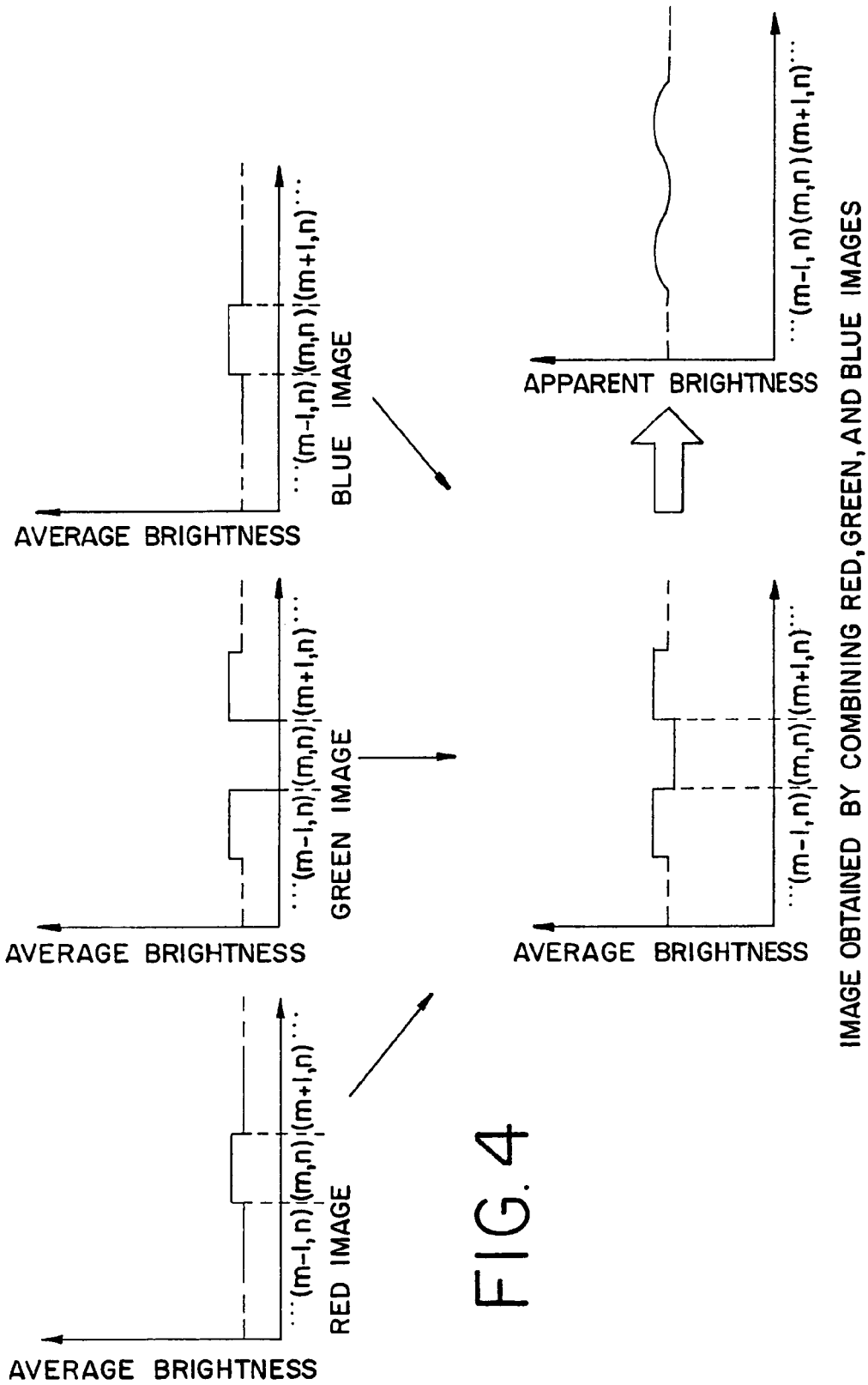
FIG. 4 a schematic diagram for explaining the concept of the present invention.

As shown in FIGS. 3 and 4, eight pixels adjacent to the defective pixel designated by the coordinates (m, n) in the green display panel, i.e., those designated by eight coordinates ((m±1, n±1), (m±1, n), (m, n±1)), may also be selected as brightness-corrected pixels, and the average brightness of these pixels and the above-described pixels in the red and blue display panels is increased so that the apparent brightness is approximately at a uniform value, performing compensation for the defect. Brightness-corrected pixels other than those adjacent to the defective pixel (m, n) in the green display panel in the example of correction shown in FIGS. 3 and 4 may also be selected. That is, the average brightness of nine pixels about the coordinates (m, n) in the red display panel may be increased, the average brightness of nine pixels about the coordinates (m, n) in the blue display panel may be increased, or the average brightness of the groups of nine pixels in all the display panels (red, blue and green) may be increased. The group of brightness-corrected pixels adjacent to the defective pixel is not limited to the eight pixels. The average brightness of some of the eight pixels or a certain number of pixels larger than eight may be increased to compensate for the defect.

Figure 5:
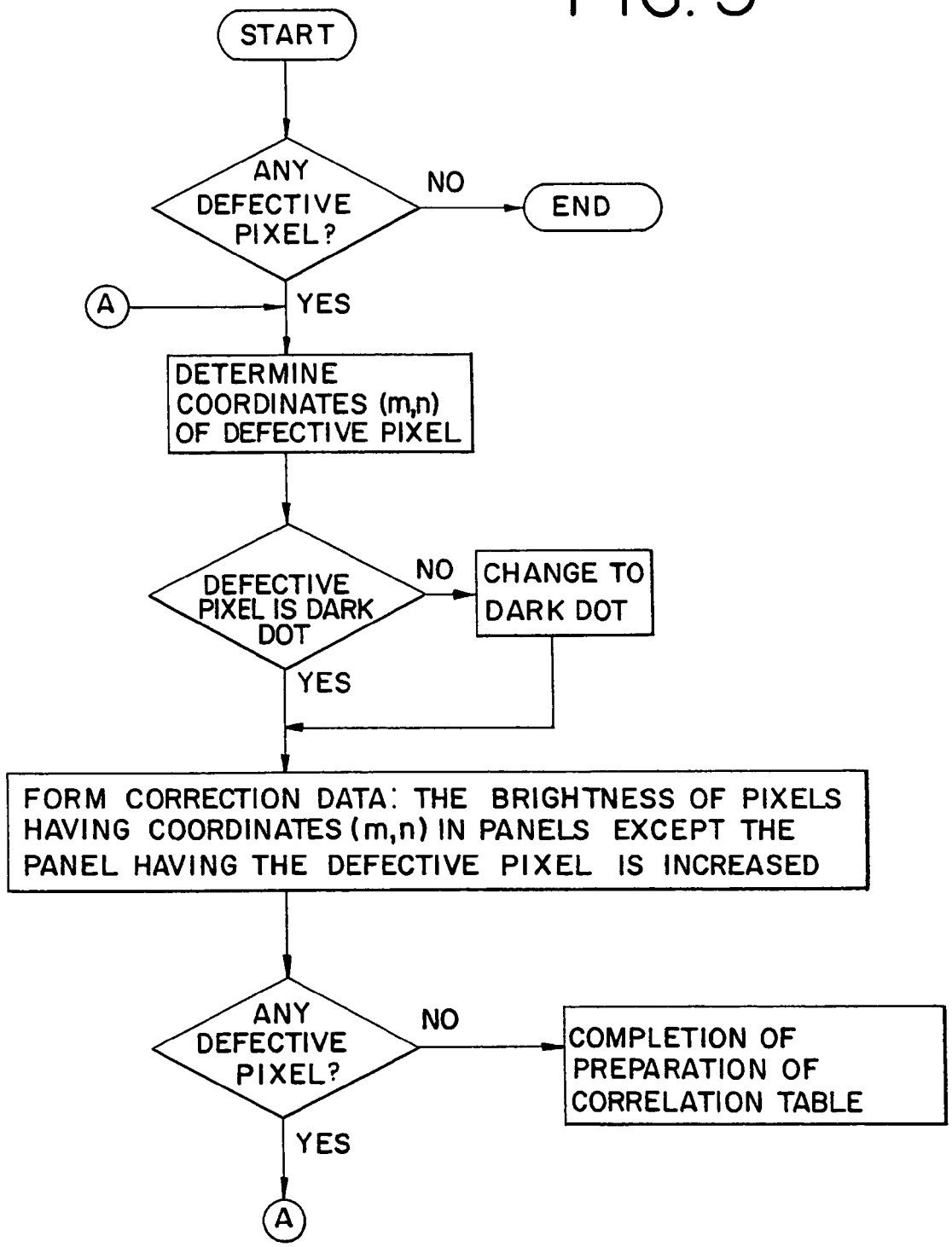
FIG. 5 is a flowchart of the process of forming correction tables in a defective pixel compensation system of the present invention.

The operation of the defective pixel compensation system of the present invention will now be described with reference to the flowchart of FIG. 5. In the preparation process of correction tables described below, the correction tables by the defective pixel compensation system are formed before liquid crystal panels are mounted in a display device.

First, it is confirmed whether there is any defective pixel in the liquid display panel. As means for confirming whether any defective pixel exists, any of well-known techniques may be used, which is, for example, a method of processing image data obtained by a CCD camera or the like, a method of specifying only TFTs on the substrate by using an optoelectronic device and a CCD camera, and a method of using a pixel reading circuit mixedly formed on the TFT substrate side.

If no defective pixel exists, the process ends and the display panels can be used as normal panel having no defective pixels. If there is a defective pixel, the coordinates of the defective pixel are determined and it is confirmed whether the defective pixel is a dark dot or a bright dot. In this specification, a dark dot denotes a state of a pixel in which the transmittance of light is substantially zero % (in any units) at all times, and a bright dot denotes a state of a pixel in which the transmittance of light is substantially 100% (in any units) at all times. If the defective pixel is a bright dot, it is changed into a dark dot by repairing using laser, or the like.

The coordinates of the defective pixel are input to a defective pixel coordinate input circuit, to which a signal to designate use of the liquid crystal panel having the defective pixel out of red, green and blue is also input. By this input, each of digital video data correction circuits for supplying image to the liquid crystal panels other than the liquid crystal panel having the defective pixel, forms correction data such that the brightness of the pixel having the same coordinates as the defective pixel is increased, and stores the correction data in a brightness correction memory.

The above-described operations are repeated with respect to all defective pixels (by return to "A"). After the completion of preparation of correction data with respect to all defective pixels, the process of preparing correction data with respect to the liquid crystal panel is finished, thus completing a correction table. In the same manner, correction tables with respect to all the three liquid crystal panels to be mounted in the display device are formed and stored in the corresponding brightness correction memories.

Thereafter, the three liquid crystal panels examined to complete the correction tables are mounted in a display device.

Figure 6:
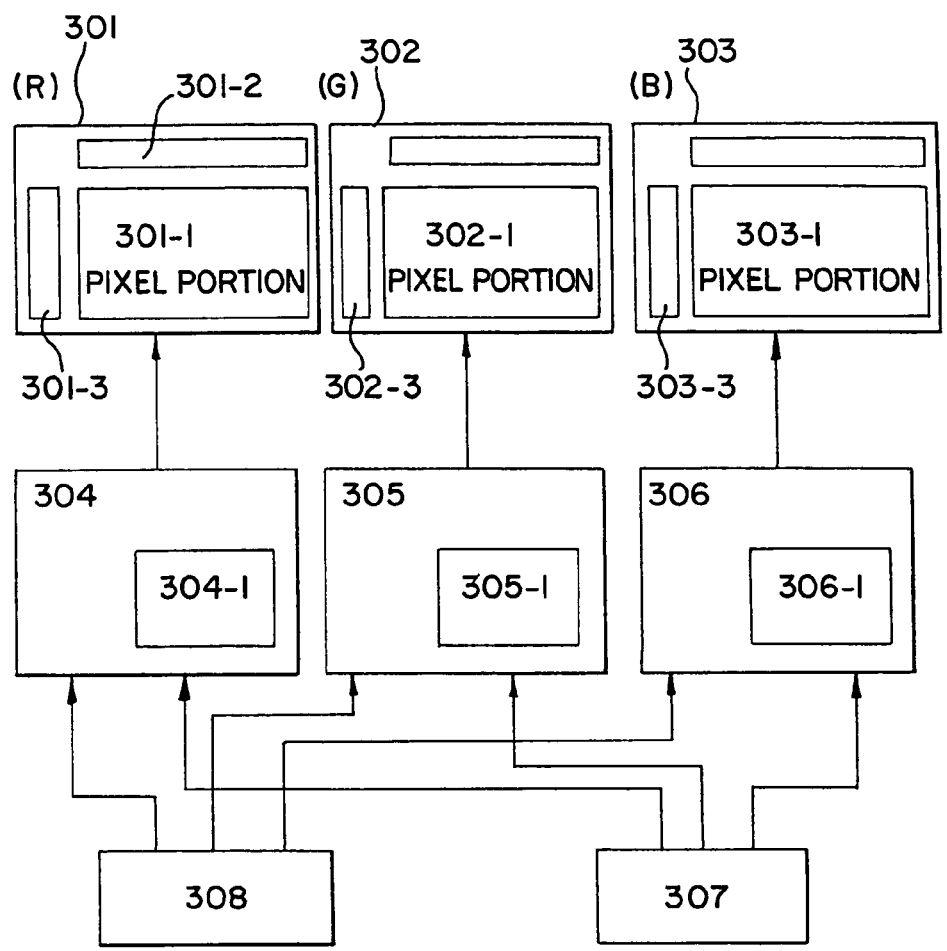
FIG. 6 is a circuit block diagram of Embodiment Mode with a projection display device of the present invention.

An example of circuits incorporating the brightness correction memories in which the above-described correction tables are stored will be described with reference to the block diagram of FIG. 6.

Liquid crystal panels 301, 302, and 303 with digital drivers are provided. The liquid crystal panels 301, 302, and 303 respectively display red (R), green (G) and blue (B) images in their pixel regions and are provided with source drivers 301-2, 302-2, and 303-2, and gate drivers 301-3, 302-3, and 303-3. The liquid crystal panels 301, 302, and 303 are all made to the same specifications. Display panels of any type other than the liquid crystal type may alternatively be used as long as they can be used as display panels of a projection display device.

Digital video data is supplied from an external digital video data supply source 308 to digital video data correction circuits 304, 305, and 306. Digital video data for red images is supplied to the digital video data correction circuit 304, digital video data for green images to the digital video data correction circuit 305, and digital video data for blue images to the digital video data correction circuit 306.

The digital video data correction circuits 304, 305, and 306 respectively supply digital video data to the liquid crystal panels 301, 302, and 303. The digital video data correction circuits 304, 305, and 306 respectively have brightness correction memories 304-1, 305-1, and 306-1. The digital video data correction circuits 304, 305, and 306 correct the input digital video data on the basis of the correction tables stored in the brightness correction memories 304-1, 305-1, and 306-1, and supply the corrected data to the liquid crystal panels.

A defective pixel coordinate input circuit 307 supplies input information of the coordinates of a defective pixel to the digital video data correction circuits of the liquid crystal panels without the defective pixel. The digital video data correction circuits form correction tables on the basis of this coordinate information and store the correction tables in the brightness correction memories.

When the display device is operating, digital video data is supplied from the outside to the digital video data correction circuits and is converted in accordance with the prepared correction tables to prepare corrected digital video data. The corrected digital video data is input to the liquid crystal panels. The liquid crystal panels display images on the basis of the corrected digital video data.

The liquid crystal panels having digital drivers have been described by way of example here. However, the present invention can also be applied to liquid crystal panels having analog drivers. In such a case, digital video data supplied from the digital video data correction circuits is converted into analog video data by D/A converter circuits before being input to the liquid crystal panels.

The above-described defective pixel compensation system can be incorporated in and integrally combined with a projection display device.

Further, image correction such as gamma correction or the like may be performed along with the above-described correction processing in the defective pixel compensation system.

Moreover, the defective pixel compensation system has been described with respect to a display device having three display panels. However, even in the case of a display device having only one display panel, the brightness of eight pixels adjacent to a defective pixel can be corrected so that the defective pixel is not easily perceptible by the human eye. This correction is particularly effective in a case where the pixel size is extremely small.

DESCRIPTION OF THE PREFERRED EMBODIMENTS

The present invention, using the above-described structure, will be further described in detail with respect to embodiments thereof.

Embodiment 1

Figure 7:
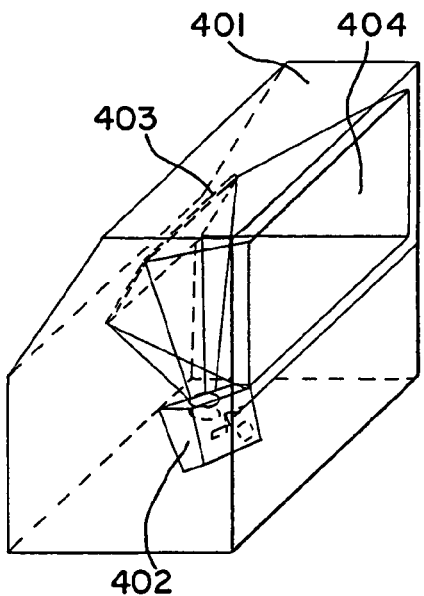
FIG. 7 is a diagram schematically showing the external appearance and the construction of a rear projector.
Figure 8:
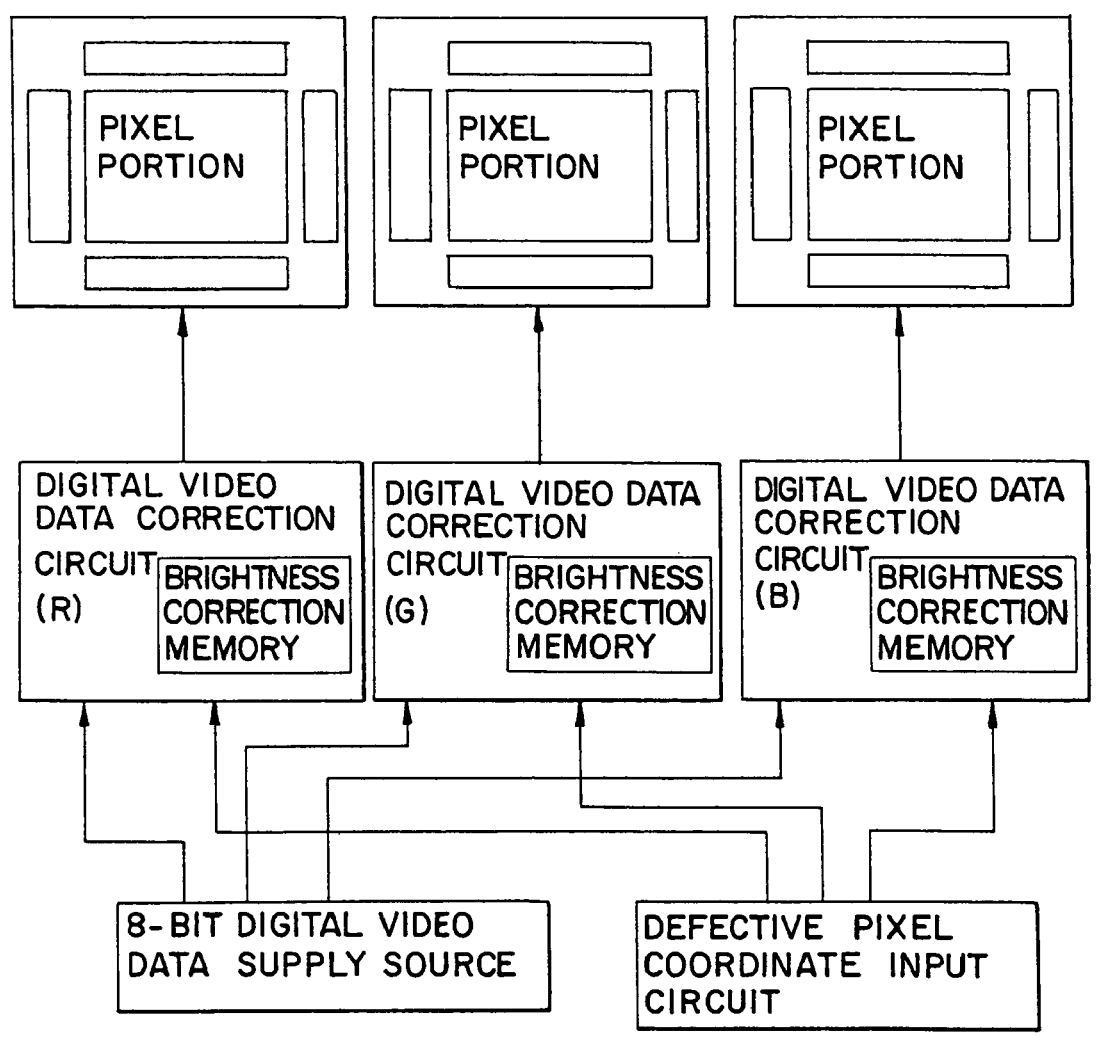
FIG. 8 is a circuit block diagram of a projection display device in Embodiment 1.
Figure 9:
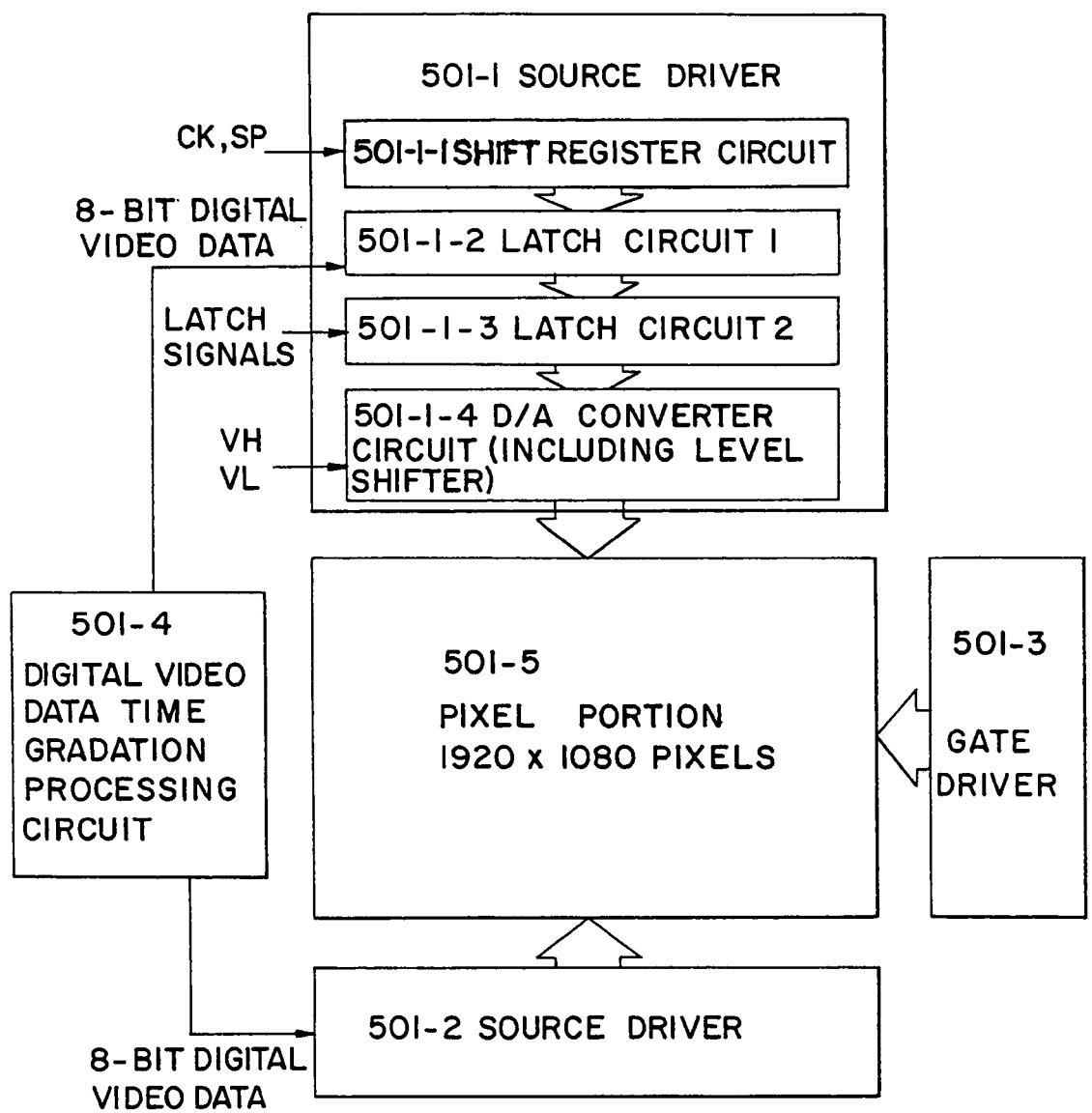
FIG. 9 is a circuit block diagram of liquid crystal panel in the Embodiment 1.

In this embodiment, a rear projector is provided as an example of a projection display device of the present invention. FIG. 7 is a perspective view of the rear projector of this embodiment, showing a rear projector body 401, a projection display device 402 of the present invention, a reflector 403, and a screen 404.

The projection display device 402 uses three liquid crystal panels, and has a light source (a white light source in this embodiment), dichroic mirrors each of which reflects only light having wavelengths in a certain wavelength region and allows light having wavelengths in the other regions to pass therethrough, total reflection mirrors, etc.

In this embodiment, liquid crystal panels having digital drivers are provided. The liquid crystal panels have pixel regions for displaying red (R), green (G), and blue (B) images, source drivers, gate drivers, a digital video data division circuit, etc. The three liquid crystal display panels are all made to the same specifications.

Eight-bit digital video data is supplied from an external digital video data supply source to digital video data correction circuits. Three groups of eight-bit digital video data for red, green and blue images are respectively supplied to the digital video data correction circuits.

The digital video data correction circuits respectively supply eight-bit digital video data to the liquid crystal panels. The digital video data correction circuits respectively have brightness correction memories. The digital video data correction circuits correct the input eight-bit digital video data on the basis of correction tables stored in the brightness correction memories, and supply the corrected data to the liquid crystal panels.

A defective pixel coordinate input circuit supplies input information on the coordinates of a defective pixel to the digital video data correction circuits of the liquid crystal panels without the defective pixel. The digital video data correction circuits form correction data on the basis of the coordinate information and store the correction data in the brightness correction memories.

The correction tables are formed as that described in the Embodiment Mode.

Correction processing based on the correction tables reduces the perceptibility of defective pixels in the image formed by combining images of the three display panels, thereby minimizing deterioration of the image. Thus, the present invention enables effective use of even a liquid crystal panel in which a certain number of defective pixels exist.

Embodiment 2

A three-plate type projector structured differently from that in the first embodiment is described in the present embodiment.

Figure 10:
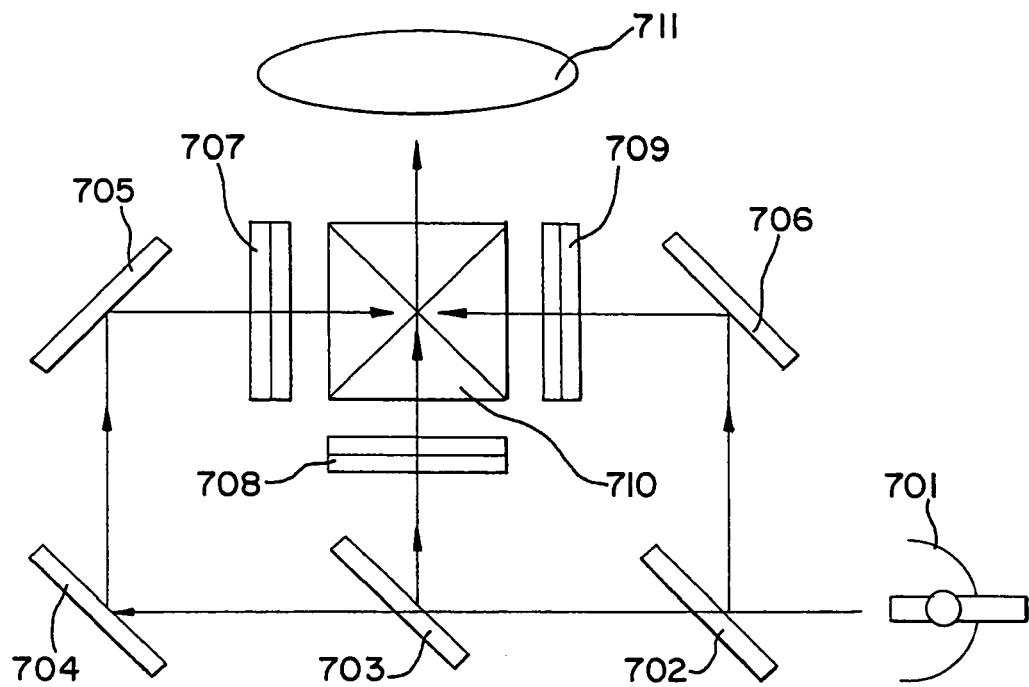
FIG. 10 is a diagram showing the construction of a projection display device of the present invention.

In FIG. 10, the reference numeral 701 denotes a light source, 702 and 703 denote dichroic mirrors, 704 to 706 denote total reflection mirrors, 707 to 709 denote liquid crystal panels, 710 denotes a dichroic prism and 711 denotes projection lens.

Figure 11:
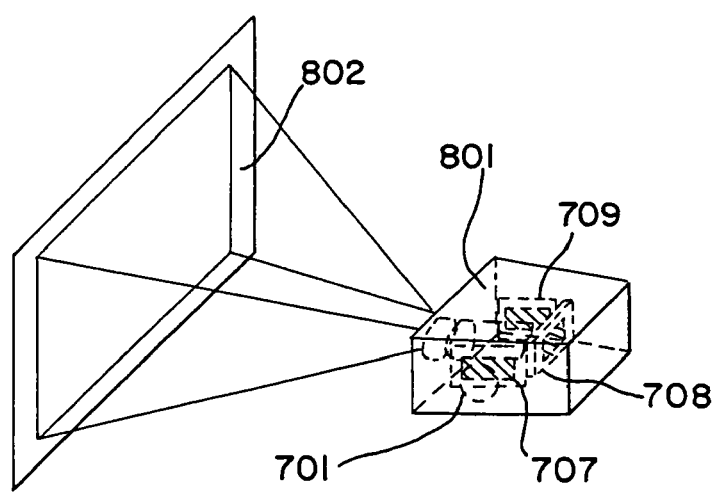
FIG. 11 is a diagram schematically showing the external appearance and the construction of a projection display device of the present invention.

An example in which the display device according to the present embodiment is used for a front projector will be shown in FIG. 11. The reference numeral 801 denotes a main body, and 802 denotes a screen.

Embodiment 3

Figure 12:
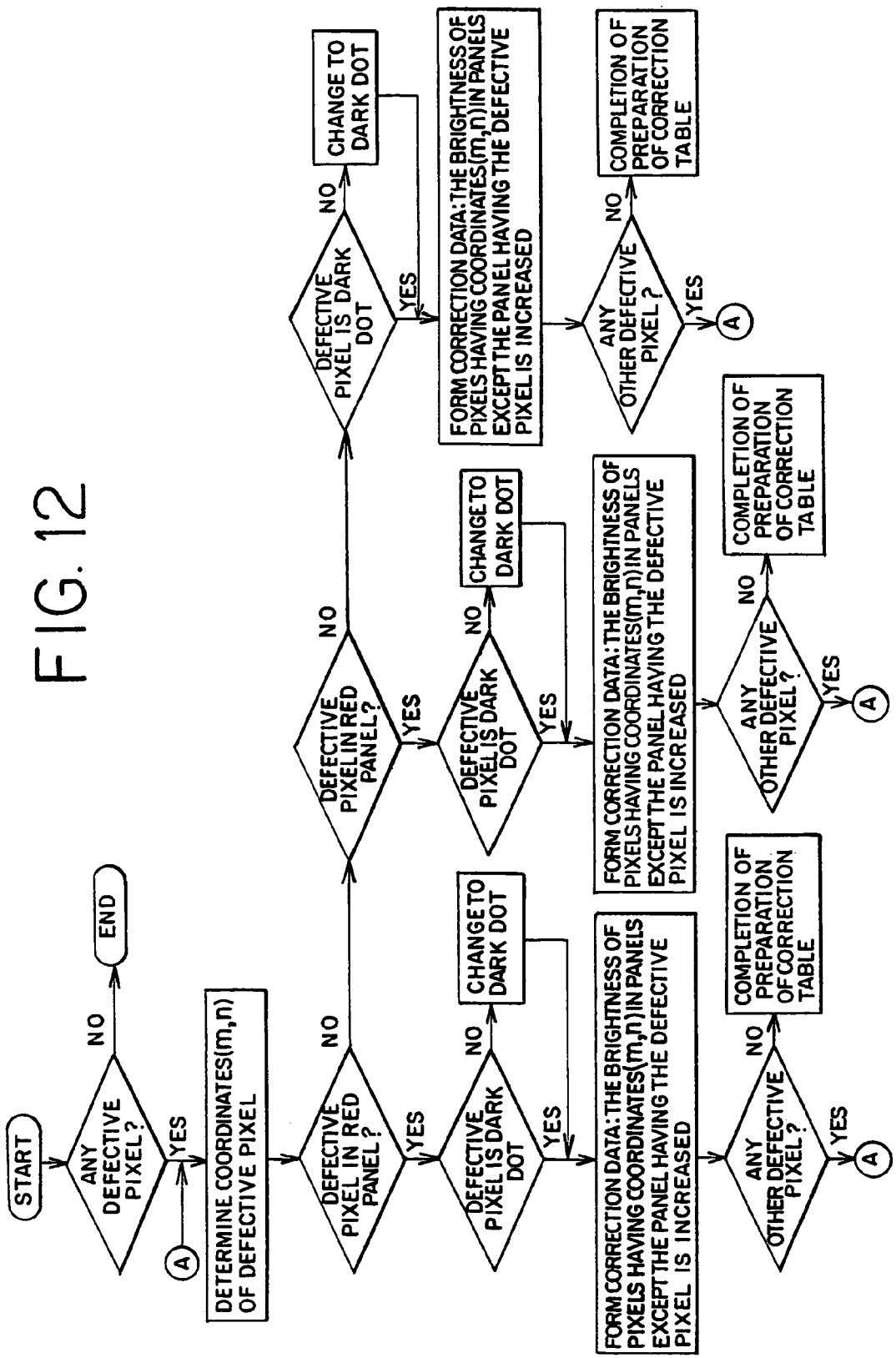
FIG. 12 is a flowchart of the process of forming correction tables in a defective pixel compensation system in Embodiment 3.

In this embodiment, the defective pixel compensation system of the present invention is operated differently from that in the first embodiment, as shown in the flowchart of FIG. 12. The process of operating the system will be described with respect to a case where the system is adapted to a display device having three liquid crystal panels already mounted therein.

First, the display device is made to operate and is confirmed whether there is any defective pixel in a color image projected onto the screen. If no defective pixel exists, the process ends and the display device is put to ordinary use. If a defective pixel exists, the coordinates of the defective pixel are determined and it is determined which panel of the red, green, and blue display panels is corresponding to the liquid crystal panel having the defective pixel.

If the liquid crystal panel with the defective pixel is the red liquid crystal panel, it is confirmed as to whether the defective pixel is a dark dot or a bright dot. If the defective pixel is a dark dot, the coordinates of the defective pixel are input to the defective pixel coordinate input circuit, which outputs the coordinates of the defective pixel to the digital video data correction circuits for supplying images to the green and blue liquid crystal panels. Each of the digital video data correction circuits forms correction data such that the brightness of the pixel having the same coordinates as the defective pixel is increased, and stores the correction data in the brightness correction memory.

If the liquid crystal panel having the defective pixel is the green display panel, it is confirmed whether or not the defective pixel is a dark dot. If the defective pixel is a dark dot, the coordinates of the defective pixel are input to the defective pixel coordinate input circuit, which outputs the coordinates of the defective pixel to the digital video data correction circuits for supplying images to the blue and red liquid crystal panels. Each of the digital video data circuits forms correction data such that the brightness of the pixel having the same coordinates as the defective pixel is increased, and stores the correction data in the brightness correction memory.

If the liquid crystal panel having the defective pixel is neither the red liquid crystal panel nor the green liquid crystal panel, the defective pixel exists in the blue display panel. Also in this case, it is confirmed whether or not the defective pixel is a dark dot. If the defective pixel is a dark dot, the coordinates of the defective pixel are input to the defective pixel coordinate input circuit, which outputs the coordinates of the defective pixel to the digital video data correction circuits for supplying images to the red and green liquid crystal panels. Each of the digital video data circuits forms correction data such that the brightness of the pixel having the same coordinates as the defective pixel is increased, and stores the correction data in the brightness correction memory.

The above-described steps are repeated with respect to all defective pixels (by return to "A").

In the above-described manner, correction data is formed with respect to all the three liquid crystal panels mounted in the display device, thereby completing correction tables.

Thereafter, input digital video data is converted on the basis of the correction tables stored in the brightness correction memories of the digital video data correction circuits.

Correction processing based on the correction tables reduces the perceptibility of defective pixels in the image formed by combining images of the three display panels, thereby minimizing deterioration of the image. Thus, the present invention enables effective use of even a liquid crystal panel in which a certain number of defective pixels exist.

Embodiment 4

An example of manufacturing method for the liquid crystal panel used in the present invention is described in the present embodiment. A detailed description in accordance with the processes is made here regarding simultaneously fabricating: pixel TFTs at a pixel section; and TFTs for driver circuits disposed in the periphery of the pixel section (source driver, gate driver, D/A converter circuit, and digital video data time ratio gray scale processing circuit, etc.) over a substrate. Note that for the simplicity of the explanation, a CMOS circuit which is a base circuit for a shift register circuit, a buffer circuit, D/A converter circuit etc. is shown in the Figure for the driver circuit, and an n-channel TFT is shown.

Figure 13A:
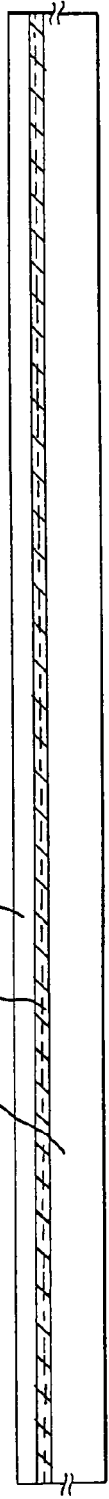
FIG. 13 is a diagram showing the process of manufacturing an AM-LCD.

In FIG. 13A, a low alkali glass substrate or a quartz substrate can be used as the substrate 6001. In this embodiment, a low alkali glass substrate was used. In this case, heat treatment may be performed beforehand at a temperature about 10-20° C. lower than the glass strain temperature. On the surface of the substrate 6001 on which the TFTs are formed, there is formed an underlayer film 6002 from such as a silicon oxide film, a silicon nitride film or a silicon oxynitride film, in order to prevent diffusion of the impurity from the substrate 6001. For example, a lamination layer is formed from a silicon oxynitride film from $SiH_4$, $NH_3$ and $N_2O$ to a thickness of 100 nm by plasma CVD, and a silicon oxynitride film similarly from $SiH_4$ and $N_2O$ to a thickness of 100 nm.

Next, a semiconductor film 6003a having an amorphous structure is formed into a thickness of 20 to 150 nm (preferably 30 to 80 nm) by a publicly known method such as plasma CVD or sputtering. In this embodiment, an amorphous silicon film was formed to a thickness of 55 nm by plasma CVD. Semiconductor films having amorphous structures include amorphous semiconductor films and micro crystalline semiconductor films, and a compound semiconductor film with an amorphous structure, such as an amorphous silicon-germanium film, may also be used. Since the underlayer film 6002 and the amorphous silicon film 6003a can be formed by the same film deposition method, they may be formed in succession. The surface contamination can be prevented by not exposing to the aerial atmosphere after forming the underlayer film, and the scattering of the characteristics in the formed TFTs and deviation of threshold voltage can be reduced. (FIG. 13A).

Figure 13B:
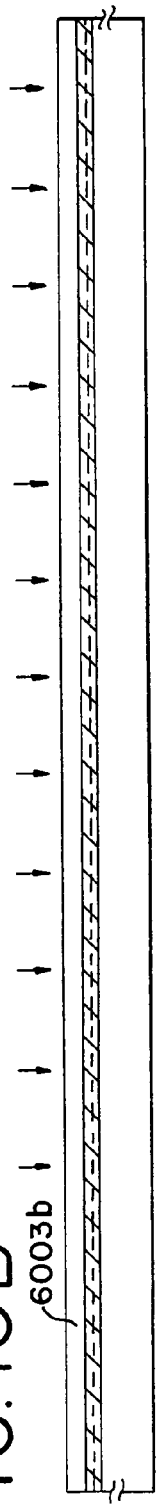

A publicly known crystallizing technique is then used to form a crystalline silicon film 6003b from the amorphous silicon film 6003a. For example, a laser crystallizing or heat crystallizing method (solid phase growth method) may be used, and here a crystalline silicon film 6003b was formed by a crystallization method using a catalyst element, according to the technique disclosed in Japanese Patent Application Laid-Open No. Hei 7-130652. Though it depends on the hydrogen content of the amorphous silicon film, heat treatment is preferably performed for about one hour at 400 to 500° C. to reduce the hydrogen content to 5 atom % or lower prior to crystallization. Crystallization of the amorphous silicon film causes rearrangement of the atoms to a more dense form, so that the thickness of the crystalline silicon film that is fabricated is reduced by approximately 1 to 15% from the thickness of the original amorphous silicon film (55 nm in this embodiment) (FIG. 13B).

Figure 13C:
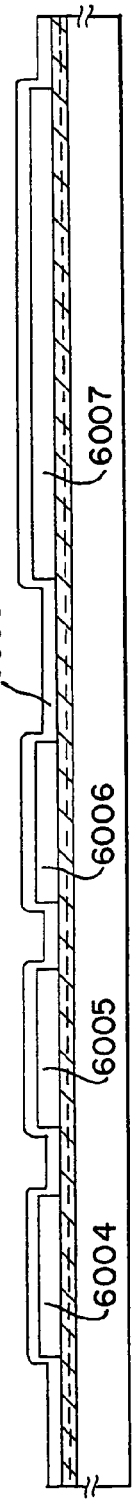

The crystalline silicon film 6003b is then separated into island shape to form island semiconductor layers 6004 to 6007. A mask layer 6008 is then formed by a silicon oxide film with a thickness of 50 to 100 nm by plasma CVD or sputtering (FIG. 13C).

A resist mask 6009 is then disposed, and boron (B) is added as a p-type impurity element at a concentration of about $1\times10^{16}$ to $5\times10^{17}$ atoms/cm$^3$ for the purpose of controlling the threshold voltage, over the entire surface of the island semiconductor layers 6005 to 6007 that form the n-channel-type TFT. The addition of boron (B) may be accomplished by an ion doping, or it may be added simultaneously with formation of the amorphous silicon film. While the addition of boron (B) is not necessarily essential, the semiconductor layers 6010 to 6012 were preferably formed with boron (B) added thereto to keep the threshold voltage of the n-channel TFT in the prescribed range (FIG. 13D).

An impurity element imparting an n-type is selectively added to the island semiconductor layers 6010 and 6011 in order to form the LDD regions of the n-channel-type TFT of the driving circuit. Resist masks 6013 to 6016 are formed beforehand for this purpose. The n-type impurity element used may be phosphorus (P) or arsenic (As), and in this case, an ion doping method was employed using phosphine ($PH_3$) for addition of phosphorus (P). The phosphorus (P) concentration of the formed impurity regions 6017 and 6018 may be in the range of $2\times10^{16}$ to $5\times10^{19}$ atoms/cm$^3$. Throughout the present specification, the concentration of the n-type impurity element in the impurity regions 6017 to 6019 formed here will be represented as (n−). Further, the impurity region 6019 is a semiconductor layer for formation of the storage capacitor of the pixel matrix circuit, and phosphorus (P) was added in the same concentration in this region as well (FIG. 14A).

Figure 13D:
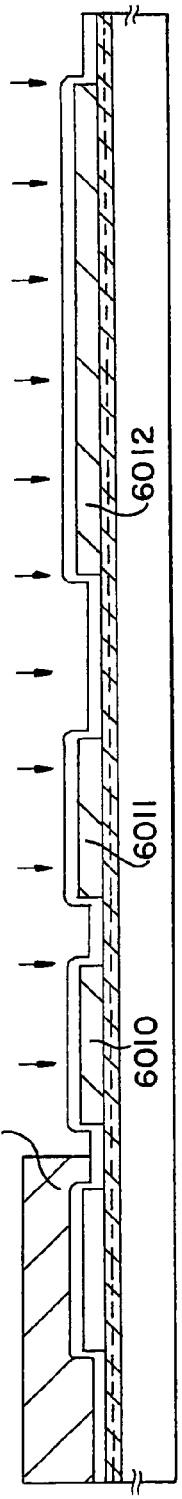
Figure 18:
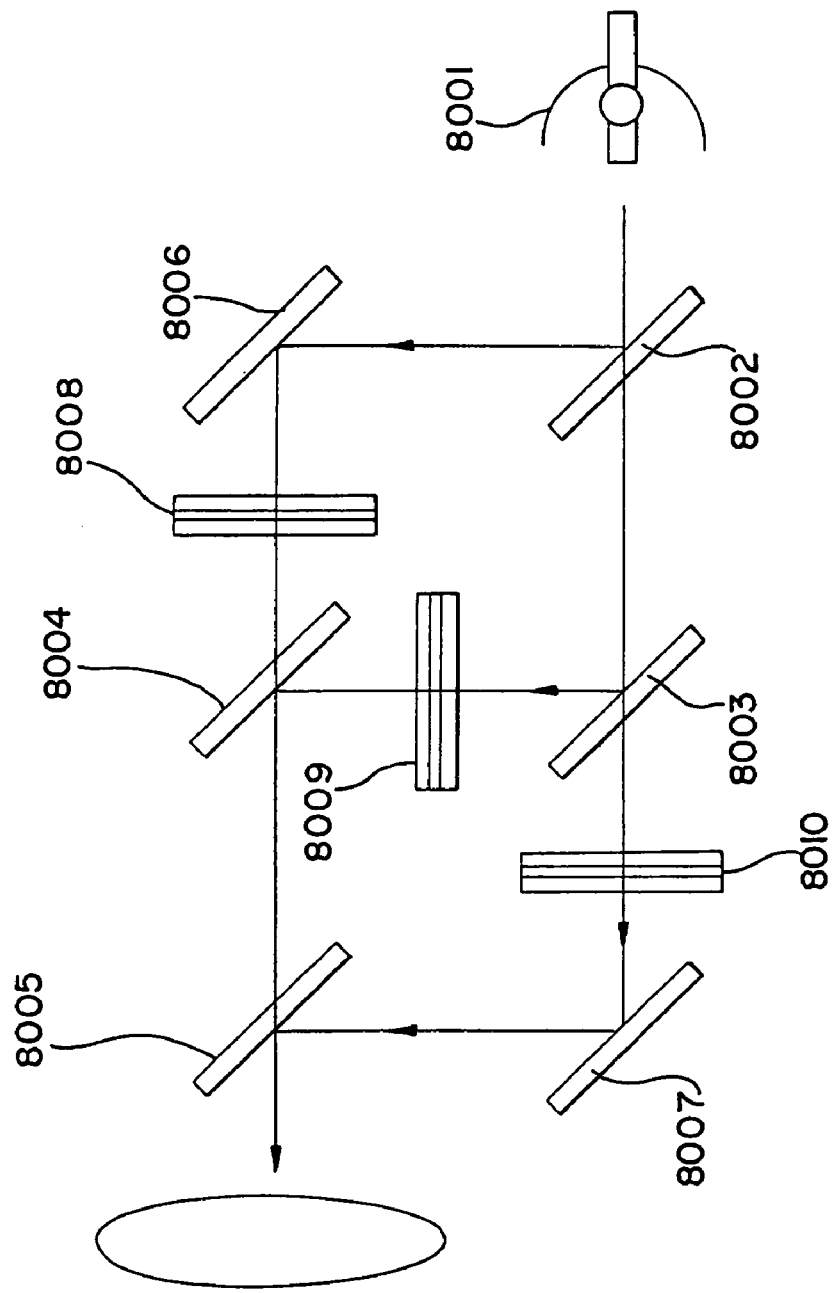
FIG. 18 is a diagram schematically showing the construction of a three-panel type projection display device.
Figure 19:
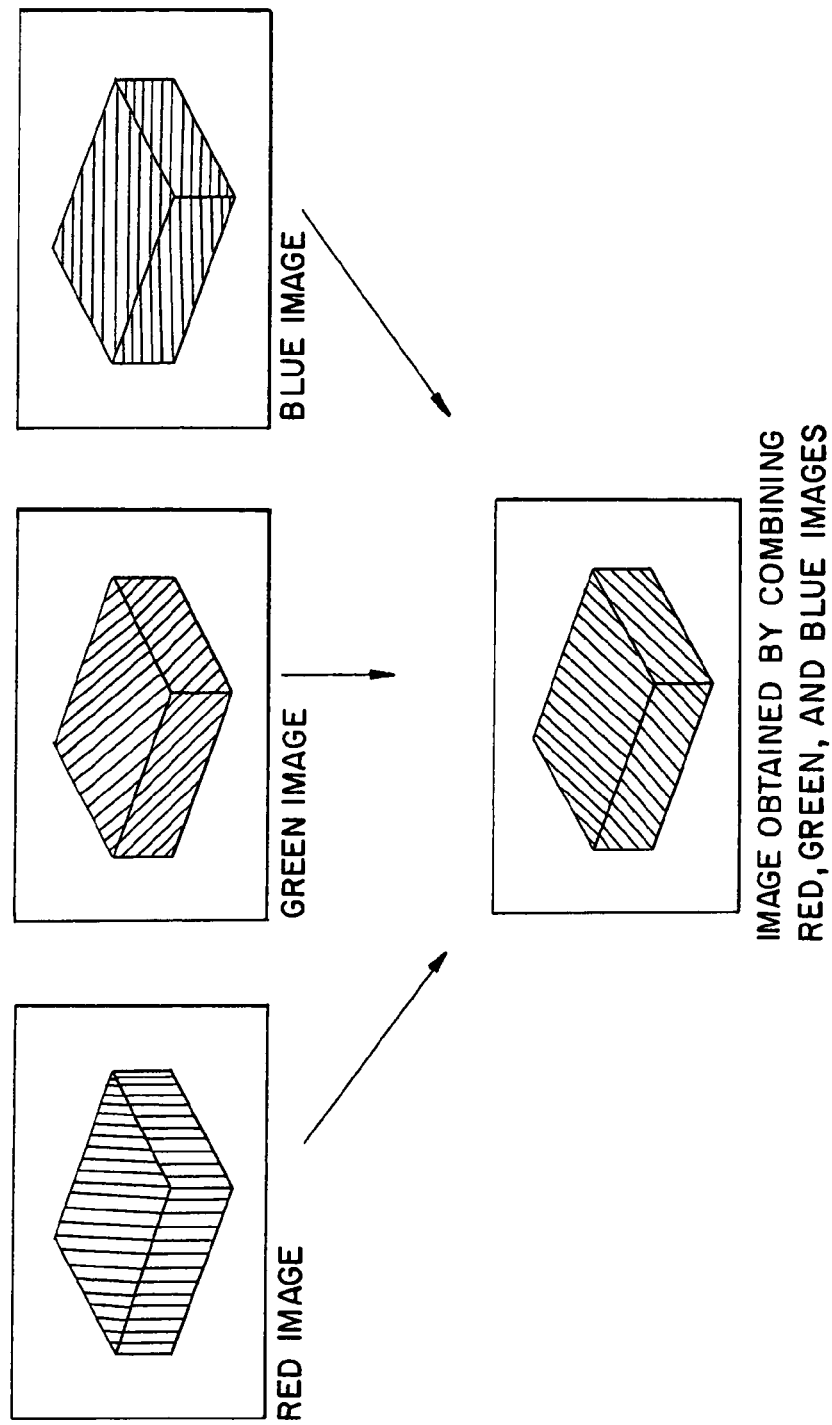
FIG. 19 is a diagram showing a state where three images are combined to form a color image.

This is followed by a step of removing the mask layer 6008 by hydrofluoric acid or the like, and a step of activating the impurity elements added in FIG. 13D and FIG. 14A. The activation may be carried out by heat treatment for 1 to 4 hours at 500 to 600° in a nitrogen atmosphere, or by a laser activation method. These may also be carried out in combination. In this embodiment, a laser activation method was used in which a linear beam is formed by using KrF excimer laser light (248 nm wavelength) and scanned the laser beam at an oscillation frequency of 5 to 50 Hz and an energy density of 100 to 500 mJ/cm$^2$ with 80 to 98% overlap ratio, to treat the entire substrate on which the island semiconductor layers had been formed. There are no particular restrictions on the laser light irradiation conditions, and they may be appropriately set by the operator.

A gate insulating film 6020 is then formed with an insulating film comprising silicon to a thickness of 10 to 250 nm using plasma CVD or sputtering. For example, a silicon oxynitride film is formed to a thickness of 120 nm. The gate insulating film may also be a single layer or multilayer structure of other silicon-containing insulating films (FIG. 14B).

A first conductive layer is then deposited to form the gate electrodes. This first conductive layer may be formed as a single layer, but if necessary it may also have a laminated structure of two or three layers. In this embodiment, a conductive layer (A) 6021 comprising a conductive metal nitride film and a conductive layer (B) 6022 comprising a metal film were laminated. The conductive layer (B) 6022 may be formed of an element selected from among tantalum (Ta), titanium (Ti), molybdenum (Mo) and tungsten (W), or an alloy composed mainly of one of these elements, or an alloy film comprising a combination of these elements (typically a Mo—W alloy film or Mo—Ta alloy film), and the conductive layer (A) 6021 is formed of tantalum nitride (TaN), tungsten nitride (WN), titanium nitride (TiN) or molybdenum nitride (MoN). As alternative materials for the conductive layer (A) 6021, there may be used tungsten silicide, titanium silicide or molybdenum silicide. The conductive layer (B) may have a reduced impurity concentration for the purpose of lower resistance, and in particular the oxygen concentration was satisfactory at 30 ppm or lower. For example, tungsten (W) with an oxygen concentration of 30 ppm or lower allowed realization of a resistivity of 20 μΩcm or lower.

The conductive layer (A) 6021 may be 10 to 50 nm (preferably 20 to 30 nm) and the conductive layer (B) 6022 may be 100 to 400 nm (preferably 250 to 350 nm). In this embodiment, a tantalum nitride film with a thickness of 30 nm was used as the conductive layer (A) 6021 and a Ta film of 350 nm was used as the conductive layer (B) 6022, and both were formed by sputtering. In this film formation by sputtering, addition of an appropriate amount of Xe or Kr to the Ar sputtering gas can alleviate the internal stress of the formed film to thus prevent peeling of the film. Though not shown, it is effective to form a silicon film doped with phosphorus (P) to a thickness of about 2 to 20 nm under the conductive layer (A) 6021. This can improve adhesion and prevent oxidation of the conductive film formed thereover, while also preventing diffusion of trace alkali metal elements into the gate insulating film 6020 that are contained in the conductive layer (A) or conductive layer (B) (FIG. 14C).

Resist masks 6023 to 6027 are then formed, and the conductive layer (A) 6021 and conductive layer (B) 6022 are etched together to form gate electrodes 6028 to 6031 and a capacitance wiring 6032. The gate electrodes 6028 to 6031 and capacitance wiring 6032 are integrally formed from 6028a to 6032a comprising conductive layer (A) and 6028b to 6032b comprising conductive layer (B). Here, the gate electrodes 6029 and 6030 formed in the driving circuit are formed so as to overlap with a portion of the impurity regions 6017 and 6018 by interposing the gate insulating layer 6020 (FIG. 14D).

This is followed by a step of adding a p-type impurity element to form the source region and drain region in the p-channel TFTs of the driving circuit. Here, the gate electrode 6028 is used as a mask to form impurity regions in a self-alignment manner. The region in which n-channel TFTs are formed is covered at this time with a resist mask 6033. The impurity region 6034 is formed by ion doping using diborane ($B_2H_6$). The boron (B) concentration of this region is $3\times10^{20}$ to $3\times10^{21}$ atoms/cm3. Throughout this specification, the concentration of the p-type impurity element in the impurity region 6034 formed here will be represented as (p+) (FIG. 15A).

Next, impurity regions functioning as a source region or a drain region were formed in the n-channel TFT. Resist masks 6035 to 6037 were formed, and an n-type impurity element was added to form impurity regions 6038 to 6042. This was accomplished by ion doping using phosphine ($PH_3$), and the phosphorus (P) concentration in the regions was in the range of $1\times10^{20}$ to $1\times10^{21}$ atoms/cm$^3$. Throughout the present specification, the concentration of the n-type impurity element in the impurity regions 6038 to 6042 formed here will be represented as (n+) (FIG. 15B).

The impurity regions 6038 to 6042 already contain phosphorus (P) or boron (B) added in the previous step, but since a sufficiently high concentration of phosphorus (P) is added in comparison, the influence of the phosphorus (P) or boron (B) added in the previous step may be ignored. Because the concentration of phosphorus (P) added to the impurity region 6038 is ½ to ⅓ of the boron (B) concentration added in FIG. 15A, the p-type conductivity is guaranteed so that there is no effect on the properties of the TFT.

This was followed by a step of adding an n-type impurity to form an LDD region in the n-channel type TFT of the pixel matrix circuit. Here, the gate electrode 6031 was used as a mask for addition of an n-type impurity element in a self-aligning manner by ion doping. The concentration of phosphorus (P) added was $1\times10^{16}$ to $5\times10^{18}$ atoms/cm$^3$, and addition of a lower concentration than the concentrations of the impurity elements added in FIGS. 14A, 15A and 15B substantially forms only impurity regions 6043 and 6044. Throughout this specification, the concentration of the n-type impurity element in these impurity regions 6043 and 6044 will be represented as (n−−) (FIG. 15C).

This was followed by a step of heat treatment for activation of the n-type or p-type impurity element added at their respective concentrations. This step can be accomplished by furnace annealing, laser annealing or rapid thermal annealing (RTA). Here, the activation step was accomplished by furnace annealing. The heat treatment is carried out in a nitrogen atmosphere containing oxygen at a concentration no greater than 1 ppm, preferably no greater than 0.1 ppm, at 400 to 800° C., typically 500 to 600° C., and for this embodiment the heat treatment was carried out at 550° C. for 4 hours. When a heat resistant material such as a quartz substrate is used for the substrate 6001, the heat treatment may be at 800° C. for one hour, and this allowed activation of the impurity element and formation of a satisfactory junction between an impurity region added with an impurity element and a channel forming region. In the heat treatment, conductive layers (C) 6028c to 6032c are formed to a thickness of 5 to 80 nm from the surfaces of the metal films 6028b to 6032b which comprise the gate electrodes 6028 to 6031 and the capacitance wiring 6032. For example, when the conductive layers (B) 6028b to 6032b comprise tungsten (W), tungsten nitride (WN) is formed, whereas when tantalum (Ta) is used, tantalum nitride (TaN) can be formed. The conductive layers (C) 6028c to 6032c may be formed in the same manner by exposing the gate electrodes 6028 to 6032 to a plasma atmosphere containing nitrogen, using either nitrogen or ammonia. Further a process for hydrogenation was also performed on the island semiconductor layers by heat treatment at 300 to 450° C. for 1 to 12 hours in an atmosphere containing 3 to 100% hydrogen. This step is for terminating the dangling bond of the semiconductor layer by thermally excited hydrogen. Plasma hydrogenation (using plasma-excited hydrogen) may also be carried out as another means for hydrogenation.

When the island semiconductor layer were fabricated by a method of crystallization from an amorphous silicon film using a catalyst element, a trace amount of the catalyst element remained in the island semiconductor layers. While the TFT can be completed even in this condition, needless to say, it is more preferable for the residual catalyst element to be eliminated at least from the channel forming region. One means used to eliminate the catalyst element was utilizing the gettering effect by phosphorus (P). The phosphorus (P) concentration necessary for gettering is on the same level as the impurity region (n+) formed in FIG. 15B, and the heat treatment for the activation step carried out here allowed gettering of the catalyst element from the channel forming region of the n-channel-type TFT and p-channel-type TFT (FIG. 15D).

After completion of the steps of activation and hydrogenation, the second conductive layer which becomes the gate wiring is formed. This second conductive layer may be formed with a conductive layer (D) composed mainly of aluminum (Al) or copper (Cu) as low resistance materials, and a conductive layer (E) made of titanium (Ti), tantalum (Ta), tungsten (W) or molybdenum (W). In this embodiment, the conductive layer (D) 6045 was formed from an aluminum (Al) film containing 0.1 to 2 wt % titanium (Ti), and the conductive layer (E) 6046 was formed from a titanium (Ti) film. The conductive layer (D) 6045 may be formed to 100 to 400 nm (preferably 250 to 350 nm), and the conductive layer (E) 6046 may be formed to 50 to 200 nm (preferably 100 to 150 nm) (FIG. 16A).

The conductive layer (E) 6046 and conductive layer (D) 6045 were etched to form gate wirings 6047, 6048 and a capacitance wiring 6049 for forming the gate wiring connecting the gate electrodes. In the etching treatment, first removed from the surface of the conductive layer (E) to partway through the conductive layer (D) by dry etching using a mixed gas of $SiCl_4$, $Cl_2$ and $BCl_3$, and then wet etching was performed with a phosphoric acid-based etching solution to remove the conductive layer (D), thus allowing formation of a gate wiring while maintaining selective working with the ground layer.

A first interlayer insulating film 6050 is formed with a silicon oxide film or silicon oxynitride film to a thickness of 500 to 1500 nm, and then contact holes are formed reaching to the source region or drain region formed in each island semiconductor layer, to form source wirings 6051 to 6054 and drain wirings 6055 to 6058. While not shown here, in this embodiment, the electrode has a 3-layer laminated structure with continuous formation of a Ti film to 100 nm, a Ti-containing aluminum film to 300 nm and a Ti film to 150 nm by sputtering.

Next, a silicon nitride film, silicon oxide film or a silicon oxynitride film is formed to a thickness of 50 to 500 nm (typically 100 to 300 nm) as a passivation film 6059. Hydrogenation treatment in this state gave favorable results for enhancement of the TFT characteristics. For example, heat treatment may be carried out for 1 to 12 hours at 300 to 450° C. in an atmosphere containing 3 to 100% hydrogen, or a similar effect may be achieved by using a plasma hydrogenation method. Note that an opening may be formed in the passivation film 6059 here at the position where the contact holes are to be formed for connection of the pixel electrodes and the drain wirings (FIG. 16C).

Thereafter, a second interlayer insulating film 6060 comprising an organic resin is formed to a thickness of 1.0 to 1.5 μm. The organic resin used may be polyimide, acrylic, polyamide, poly imide amide, BCB (benzocyclobutene) or the like. Here, a polyimide which thermally polymerizes after coating over the substrate is applied and fired at 300° C. A contact hole reaching to the drain wiring 6058 is then formed in the second interlayer insulating film 6060, and pixel electrodes 6061 and 6062 are formed. The pixel electrodes used may be of a transparent conductive film in the case of forming a transmission type liquid crystal display device, or of a metal film in the case of forming a reflective type liquid crystal display device. In this embodiment an indium-tin oxide (ITO) film was formed by sputtering to a thickness of 100 nm in order to form a transmission type liquid crystal display device (FIG. 17).

A substrate comprising a driving circuit TFT and a pixel TFT of the pixel section was completed over a substrate in this manner. A p-channel TFT 6101, a first n-channel TFT 6102 and a second n-channel TFT 6103 were formed on the driving circuit and a pixel TFT 6104 and a storage capacitor 6105 were formed on the pixel section Throughout the present specification, this substrate will be referred to as an active matrix substrate for the simplicity of explanation.

The p-channel TFT 6101 of the driving circuit comprises an island semiconductor layer 6004 which comprises a channel forming region 6106, source regions 6107a and 6107b, and drain regions 6108a and 6108b. The first n-channel TFT 6102 comprises an island semiconductor layer 6005 which comprises a channel forming region 6109, an LDD region 6110 overlapping the gate electrode 6029 (hereinafter this type of LDD region will be referred to as Lov), a source region 6111 and a drain region 6112. The length of this Lov region in the channel length direction was 0.5 to 3.0 μm, and is preferably 1.0 to 1.5 μm. The second n-channel TFT 6103 comprises an island semiconductor layer 6006 which comprises a channel forming region 6113, LDD regions 6114 and 6115, a source region 6116 and a drain region 6117. These LDD regions are formed of an lov region and an LDD region not overlapping the gate electrode 6030 (hereinafter this type of LDD region will be referred to as Loff), and the length of this Loff region in the channel length direction is 0.3 to 2.0 μm, and preferably 0.5 to 1.5 μm. The pixel TFT 6104 comprises an island semiconductor layer 6007 which comprises a channel forming regions 6118 and 6119, Loff regions 6120 to 6123 and source or drain regions 6124 to 6126. The length of the Loff regions in the channel length direction is 0.5 to 3.0

μm, and preferably 1.5 to 2.5 μm. Further, a storage capacitor 6105 is formed from: capacitance wirings 6032 and 6049; an insulating film formed from the same material as a gate insulating film; and a semiconductor layer 6127 added with an impurity element imparting n-type which is connected to drain region 6126 of the pixel TFT 6104. In FIG. 17 the pixel TFT 6104 has a double gate structure, but it may also have a single gate structure, and there is no problem with a multi-gate structure provided with multiple gate electrodes.

Then, using a know method, a substrate 6067 on which a counter electrode 6068 and an alignment film 6069 are formed, and an active matrix substrate are mated to each other with a sealing material (not shown in figure). Thereafter, a liquid crystal 6070 is injected therebetween and sealed with a sealing material (not shown in figure). In the present embodiment, display is accomplished by using nematic liquid crystal with twisted nematic mode (TN mode).

In this way, a liquid crystal panel of the present embodiment is competed.

Thus, the present invention optimizes the structures of the TTFs which comprise each circuit in accordance with the specifications required for the pixel TFT and driving circuit, thereby enabling the operating performance and reliability of the semiconductor device to be improved. In addition, formation of the gate electrodes with a heat resistant conductive material enabled to facilitate activation of the LDD regions and source and drain regions, and formation of the gate wirings with low resistance materials adequately reduce wiring resistance. This allows application to display devices having a pixel section (screen sizes) in the class of 4 inches and larger.

Further, a liquid crystal panel completed in accordance with the present embodiment can be applied to one of embodiments 1 to 3.

Embodiment 5

While an example of the display device using three display panels described above as the Embodiment 1, an example of a display device using one display panel will described as Embodiment 5.

It is assumed that there is a defective pixel at a position designated by coordinates (m, n) in one display panel.

In this embodiment, the average brightness of pixels designated by coordinates (m±1, n±1) adjacent to the coordinates (m, n) of the defective pixel is increased so that the apparent brightness is made to approximately a uniform level, thereby performing compensation for the defect. The average brightness of pixels designated by coordinates (m±2, n±2) may also be increased as well as that of the pixels designated by the coordinates (m±1, n±1) adjacent to the defective pixel.

The above-described correction of the brightness of pixels adjacent to a defective pixel reduces the perceptibility of the defective pixel existing in the display panel so that the defective pixel is not easily perceptible by the human eye. In this embodiment, this correction is particularly effective in a case where the pixel size is extremely small.

Conventionally, the display quality of a display panel having only several defective pixels was regarded as defective, and it is extremely difficult to manufacture display panels having no pixel defects because the required resolution is high and elements for forming pixels are extremely small, resulting in a disadvantageously low yield.

However, the present invention ensures that even a display panel having some pixel defects can have the same display quality level as display panels having no pixel defects. As a result, the present invention makes it possible to greatly improve the yield of products without changing the manufacturing process.

For example, by utilizing the present invention, in a case of a 60-inch rear projector, an image quality deterioration level as seen at 3H (2.2 m) is reduced to the same level as an image quality deterioration level as seen at 4H (3 m).

Also, according to the present invention, deterioration of the display quality of a direct-view type display device can be reduced even when the display quality is viewed from a close distance.

What is claimed is:

1. A display device comprising:
a plurality of display panels, wherein at least one of the plurality of display panels has a defective pixel at a coordinate (m, n);
a defective pixel compensation system which increases a brightness of at least eight pixels of coordinates (m−1, n−1), (m−1, n), (m−1, n+1), (m, n−1), (m,n+1), (m+1, n−1), (m+1, n) and (m+1, n+1); and
a defective pixel coordinate input circuit which inputs the coordinate of the defective pixel to the defective pixel compensation system.

2. A display device according to claim 1, wherein the defective pixel compensation system includes a brightness correction memory.

3. A display device according to claim 1, wherein the plurality of display panels are three display panels.

4. A display device according to claim 1, wherein the plurality of display panels are liquid crystal display panels.

5. A display device according to claim 1, wherein the display device is incorporated into a projector.

6. A display device comprising:
a plurality of display panels, wherein at least one of the plurality of display panels has a defective pixel at a coordinate (m, n);
a correction circuit which forms a correction data to increase a brightness of at least eight pixels of coordinates (m−1, n−1), (m−1, n), (m−1, n+1), (m, n−1), (m, n+1), (m+1, n−1), and (m+1, n) and (m+1, n+1); and
a defective pixel coordinate input circuit which inputs the coordinate of the defective pixel to the correction circuit.

7. A display device according to claim 6, wherein the correction circuit includes a brightness correction memory.

8. A display device according to claim 7, wherein the correction data is stored in the brightness correction memory.

9. A display device according to claim 6, wherein the plurality of display panels are three display panels.

10. A display device according to claim 6, wherein the plurality of display panels are liquid crystal display panels.

11. A display device according to claim 6, wherein the display device is incorporated into a projector.

12. A display device comprising:
a plurality of display panels, wherein at least one of the plurality of display panels has a defective pixel at a coordinate (m, n);
a defective pixel compensation system which increases a brightness of at least eight pixels of coordinates (m−1, n−1), (m−1, n), (m−1+1), (m, n−1), (m,n+1), (m+1, n−1), (m+1, n) and (m+1, n+1).

13. A display device according to claim 12, wherein the defective pixel compensation system includes a brightness correction memory.

14. A display device according to claim 12, wherein the plurality of display panels are three display panels.

15. A display device according to claim 12, wherein the plurality of display panels are liquid crystal display panels.

16. A display device according to claim 12, wherein the display device is incorporated into a projector.

17. A display device comprising:
a plurality of display panels, wherein at least one of the plurality of display panels has a defective pixel at a coordinate (m, n);
a correction circuit which forms a correction data to increase a brightness of at least eight pixels of coordinates (m−1, n−1), (m−1, n), (m−1+1), (m, n−1), (m,n+1), (m+1, n−1), (m+1, n) and (m+1, n+1).

18. A display device according to claim 17, wherein the correction circuit includes a brightness correction memory.

19. A display device according to claim 18, wherein the correction data is stored in the brightness correction memory.

20. A display device according to claim 17, wherein the plurality of display panels are three display panels.

21. A display device according to claim 17, wherein the plurality of display panels are liquid crystal display panels.

22. A display device according to claim 17, wherein the display device is incorporated into a projector.

* * * * *

UNITED STATES PATENT AND TRADEMARK OFFICE
CERTIFICATE OF CORRECTION

PATENT NO. : 7,619,700 B2 Page 1 of 1
APPLICATION NO. : 11/386619
DATED : November 17, 2009
INVENTOR(S) : Masaaki Hiroki It is certified that error appears in the above-identified patent and that said Letters Patent is hereby corrected as shown below:

On the Title Page

Item [*] Notice: Subject to any disclaimer, the term of this patent is extended or adjusted under 35 U.S.C. 154(b) by (343) days Delete the phrase "by 343 days" and insert -- by 583 days --

Signed and Sealed this

First Day of June, 2010

David J. Kappos
*Director of the United States Patent and Trademark Office*